United States Patent
Rossway et al.

(10) Patent No.: US 6,292,999 B1
(45) Date of Patent: Sep. 25, 2001

(54) METHOD OF INSTALLING AND REMOVING JET AIRCRAFT ENGINE

(75) Inventors: Ronald A. Rossway; Robert F. Hatch, both of Aurora; Behzad B. Suroosh, Evergreen, all of CO (US)

(73) Assignee: Stanley Aviation Corporation, Aurora, CO (US)

( * ) Notice: Subject to any disclaimer, the term of this patent is extended or adjusted under 35 U.S.C. 154(b) by 0 days.

(21) Appl. No.: 09/658,975

(22) Filed: Sep. 11, 2000

Related U.S. Application Data

(62) Division of application No. 09/160,739, filed on Sep. 25, 1998.

(51) Int. Cl.[7] .................................................. B23Q 7/00
(52) U.S. Cl. ............................................ 29/559; 29/281.1
(58) Field of Search .................................. 29/559, 281.1, 29/281.4, 281.6; 206/319, 335, 349

(56) References Cited

U.S. PATENT DOCUMENTS

| | | | |
|---|---|---|---|
| 2,594,586 | 4/1952 | Ries | 280/44 |
| 2,613,807 | 10/1952 | Higbee | 206/46 |
| 2,670,166 | 2/1954 | Applegate | 248/119 |
| 2,674,370 | 4/1954 | Iredell, III | 206/46 |
| 2,674,371 | 4/1954 | Blackinton | 206/46 |
| 2,685,964 | 8/1954 | Brown | 206/319 |
| 2,928,535 | 3/1960 | Simmons et al. | 206/46 |
| 2,982,395 | 5/1961 | Rados | 206/46 |
| 3,194,525 | 7/1965 | Webb | 248/119 |
| 3,211,299 | 10/1965 | Metzrath | 214/1 |
| 4,117,927 | 10/1978 | Gothsche | 206/319 |
| 4,239,196 | 12/1980 | Hanger | 269/17 |
| 4,461,455 | 7/1984 | Mills et al. | 254/3 R |
| 4,660,796 | 4/1987 | Garrec | 248/544 |
| 4,699,337 * | 10/1987 | Lewis | 244/137.1 |
| 5,297,915 | 3/1994 | Bach | 414/590 |
| 5,320,475 * | 6/1994 | Pinder | 414/343 |
| 5,383,652 * | 1/1995 | Van Den Berg | 269/17 |
| 5,645,389 | 7/1997 | Lilja et al. | 414/343 |
| 5,722,512 | 3/1998 | Lilja et al. | 187/244 |
| 5,916,367 | 10/1998 | Lilja et al. | 187/244 |
| 6,000,903 * | 12/1999 | Hatch et al. | 29/559 |
| 6,170,141 * | 1/2001 | Rossway et al. | 29/281.1 |

FOREIGN PATENT DOCUMENTS 2 174 042 A    10/1986   (GB) .

OTHER PUBLICATIONS

Thai Trent Readiness, Nov., 1994, by Roll Royce.*
Selected Sections of Advanced Ground Systems Engineering Corp. Catalog No. 134, Oct. 23, 1990.*

* cited by examiner

*Primary Examiner*—Joseph J. Hail, III
*Assistant Examiner*—Lee Wilson
(74) *Attorney, Agent, or Firm*—Sheridan Ross P.C.

(57) ABSTRACT

An aircraft engine shipping system includes a frame assembly for supporting the aircraft engine, and a cradle assembly mounted on the frame assembly for securing the aircraft engine to the frame assembly. The frame assembly includes shock absorbers to provide continual shock absorption to an aircraft engine loaded thereon. The shipping system may be configured in either a truck or air transport mode. In the truck transport mode, the aircraft engine is secured to the cradle assembly by way of an aft ring which attaches to the aft portion of the aircraft, and a pair of cradle arms which attach to the forward portion of the aircraft engine. In the air transport mode, the aircraft engine is attached to the cradle assembly by way of the aft ring, and a forward ring which attaches directly to the fan of the aircraft engine. In the air transport mode, the cradle arms are disconnected from the aircraft engine and rotated away from the engine in a stowed position. While in the air transport mode, the aircraft engine may be rotated wherein the forward and aft rings cooperate to achieve rotation of the aircraft engine. A jack system is used to raise or lower the aircraft engine in either the truck or air transport modes.

4 Claims, 23 Drawing Sheets

METHOD OF INSTALLING AND REMOVING JET AIRCRAFT ENGINE

This application is a division of Ser. No. 09/160,739 Sep. 25, 1998.

TECHNICAL FIELD

This invention relates to a shipping system providing a means of transport for an object and, more particularly, to a shipping system for transport of a jet aircraft engine wherein the shipping stand may be placed in either a truck transport mode or an air transport mode. Further, this invention relates to a method by which a jet aircraft engine may be installed and removed from the wing of an aircraft and transported by the shipping system.

BACKGROUND ART

In the aircraft industry, it is often necessary for the engines of an aircraft to be removed for inspection or repair. These aircraft engines are perhaps the most critical assembly of an aircraft which must be maintained in a high state of repair. Regular and rigorous maintenance must be performed on the engines which also require thorough inspections. Accordingly, it may be necessary to remove these engines from the wing or fuselage of an aircraft so that the engine can undergo the required inspection or repairs.

Some prior art devices exist for securing and transporting a jet engine that has been removed from an aircraft. One example of a prior art device is found in commonly assigned prior patent, U.S. Pat. No. 5,722,512. This reference discloses a shipping stand including a cradle assembly mounted upon a frame assembly to which a jet aircraft engine is securable. A plurality of shock absorbers are operatively engaged between the cradle assembly and frame assembly to provide adequate shock protection to a loaded jet aircraft engine. A plurality of lifting mechanisms selectively raise the cradle assembly to selected predetermined heights. Depending upon the selected height, the cradle may be placed in either a truck transport mode or air transport mode. Spacers are provided to place the shipping stand in a truck transport mode, and said spacers are removed in order to place the shipping stand in an air transport mode.

While this prior art device and others may be adequate for their intended purposes, one significant shortfall is that none of these prior art devices provide a shipping system which may be configured for either the truck transport of a Trent 800 aircraft engine, or the air transport of that engine in a Boeing 747 aircraft. The Boeing 747 aircraft is one of the most commercially available aircraft which may be used to haul the engines of other aircraft due to its large cargo hold. As further explained below, the invention described herein is a multi-purpose stand alone system which may configure the Trent 800 jet engine for either truck or air transport, and further allows the engine to be readily mounted or removed from the aircraft.

DISCLOSURE OF THE INVENTION

In the most broad disclosure of the invention, a shipping system is disclosed which secures a jet aircraft engine wherein the engine may be positioned in either a truck transport mode, or an air transport mode which enables the engine to be rotated as necessary. The rotation of the aircraft engine is achieved while the engine is mounted on the shipping stand, and no external equipment such as a crane or forklift are required to rotate the engine.

The advantage of such a dual mode shipping system is based upon the need to transport a jet aircraft engine on land and/or within the cargo hold of a Boeing 747 or other jet aircraft to other destinations. In both the truck and air transport modes, shock absorption is provided by the shipping system to protect it from impacts associated with both road and air travel. Without such protection, the jet engine could sustain unnecessary damage.

Conveniently, when the shipping system, with the aircraft engine attached, is placed in the air transport mode, the shipping system is lowered and the aircraft engine is rotated to further reduce the effect height of the aircraft engine enabling it to fit in the cargo door of a commercial aircraft such as a Boeing 747. Particularly for the Trent 800 engine, the engine gear box and other protruding components located adjacent the gear box present a critical height limitation in terms of loading such an engine through the cargo door of a Boeing 747. When this particular engine is mounted to the wing of an aircraft, the gear box and the other protruding components reside at the lower end of the engine. In order to meet the height restriction of the Boeing 747 cargo door, the engine must be rotated so that the gear box and other protruding components are rotated to the side. Then the engine can be lowered up to 16 inches while mounted on the shipping system.

The structure of the shipping system includes a frame assembly including a plurality of frame members which provide adequate support to a cradle assembly which cradles or secures the jet aircraft engine. Casters or wheels are mounted to the frame enabling the shipping system to be transported on the airfield by a vehicle in order that the engine may then be loaded for either truck or air transport. A shock absorbing system is operatively engaged between the frame assembly and cradle assembly to provide adequate shock protection to the jet aircraft engine despite its configuration in either the truck or air transport mode.

When the shipping system is in the truck transport mode, the cradle is lifted to a desired height by a jack assembly and the jet aircraft engine loaded on the cradle is then locked in place. In this truck transport mode, an aft securing ring is used to secure the aft end of the aircraft engine, and a pair of opposing cradle arms secure the forward end of the aircraft engine.

If the loaded aircraft engine is to be transported in the air transport mode, the aft end of the aircraft engine is secured by the aft ring; however, a forward ring is used to secure the forward end of the aircraft engine, and the forward and aft rings work in cooperation to rotate the engine while it is loaded on the shipping system. During operation in the air transport mode, the opposing cradle arms are disconnected from the aircraft engine and are swung away from the aircraft engine to avoid interference with the engine during rotation.

The jack assembly allows four independent jacks to operate in synchronization to raise or lower the aircraft engine to the desired height. Additionally, a pair of spacers may be used at the aft end of the shipping system to disable the two aft jacks so that the forward ring may be raised or lowered independently of the aft ring when preparing the shipping system for air transport.

The jack assembly and the drive means for rotating the loaded aircraft engine may be operated by hand, or mechanically. It is preferable to use the mechanical means; however, if these systems fail, the jet aircraft engine may still be manually lifted or lowered, and manually rotated.

Although the shipping system is described as having particular utility with respect to transport of a Trent 800 jet aircraft engine, it will be understood that the present invention is intended for many other uses as it is easily adaptable to accommodate the transport of many different types of jet aircraft engines for truck transport or air transport. The height of the cradle assembly in the truck transport mode and the air transport mode may be altered so that a particular jet aircraft engine may be loaded directly onto a specific type of aircraft. For example, for aircraft other than a Boeing 747, the cradle assembly may be raised or lowered by altering the specific construction of the frame assembly or cradle assembly. The forward and aft ring assemblies may be sized to allow them to attach to the desired jet aircraft engine. Also, the ranges of the jacks may also be altered to accommodate the specific height necessary for transition between the air and truck transport modes.

It should also be understood that use of the terms "truck transport mode" does not limit the transport of the shipping system by truck, but simply refers to the transfer of the shipping system by some means other than an aircraft which has certain cargo load size restrictions. Thus, truck transport mode could refer to transport by truck, ship or large cargo aircraft such as the Antoniv or the AN124 wherein there is no particular limitation on the size of the load.

By use of the shipping system of this invention, the aircraft engine may be removed from or reattached the wing of an aircraft without the necessity of using an external crane or forklift system. The cradle assembly includes four bootstrap connection points which may be used in conjunction with a simple pulley system which is hung from the underside of the wing. Therefore, there is no intermediate step necessary to move the aircraft engine between its shipping system and the wing of the aircraft.

The shipping system described provides a self contained, dual mode of transport for a jet aircraft engine loaded thereon. The shipping system therefore enables direct loading of an aircraft engine onto land or air transport by manipulating the effective height of the aircraft engine, either by raising or lowering the cradle, or by rotating the aircraft engine while it is mounted to the shipping system. Further, the shipping system of this invention enables a smooth transition from an air transport mode to a truck transport mode, and vice versa. Accordingly, the shipping system of this invention prevents having to use complicated overhead crane systems, forklifts, or other external means to load and unload the aircraft engine onto and from a shipping system, as well as obviating the need to use such cranes or forklifts for removing or reattaching the aircraft engine to the aircraft. Additionally, because of the smooth transition between the truck and air transport modes, the chances of damaging the jet aircraft engine during transport is greatly reduced. Furthermore, the process of transporting a jet aircraft engine can be accomplished in a much more cost effective and efficient manner by using the shipping system which requires no external support equipment. Particularly at those airfield locations where overhead crane or gantry systems, or heavy forklifts are not available, the shipping system of this invention enhances the overall ability of an airfield to effectively manage the manipulation of jet aircraft engines for repair, inspection, or for any other purposes in which the aircraft engine must be removed from the aircraft or transported.

BEST MODE FOR CARRYING OUT THE INVENTION

Figure 1:
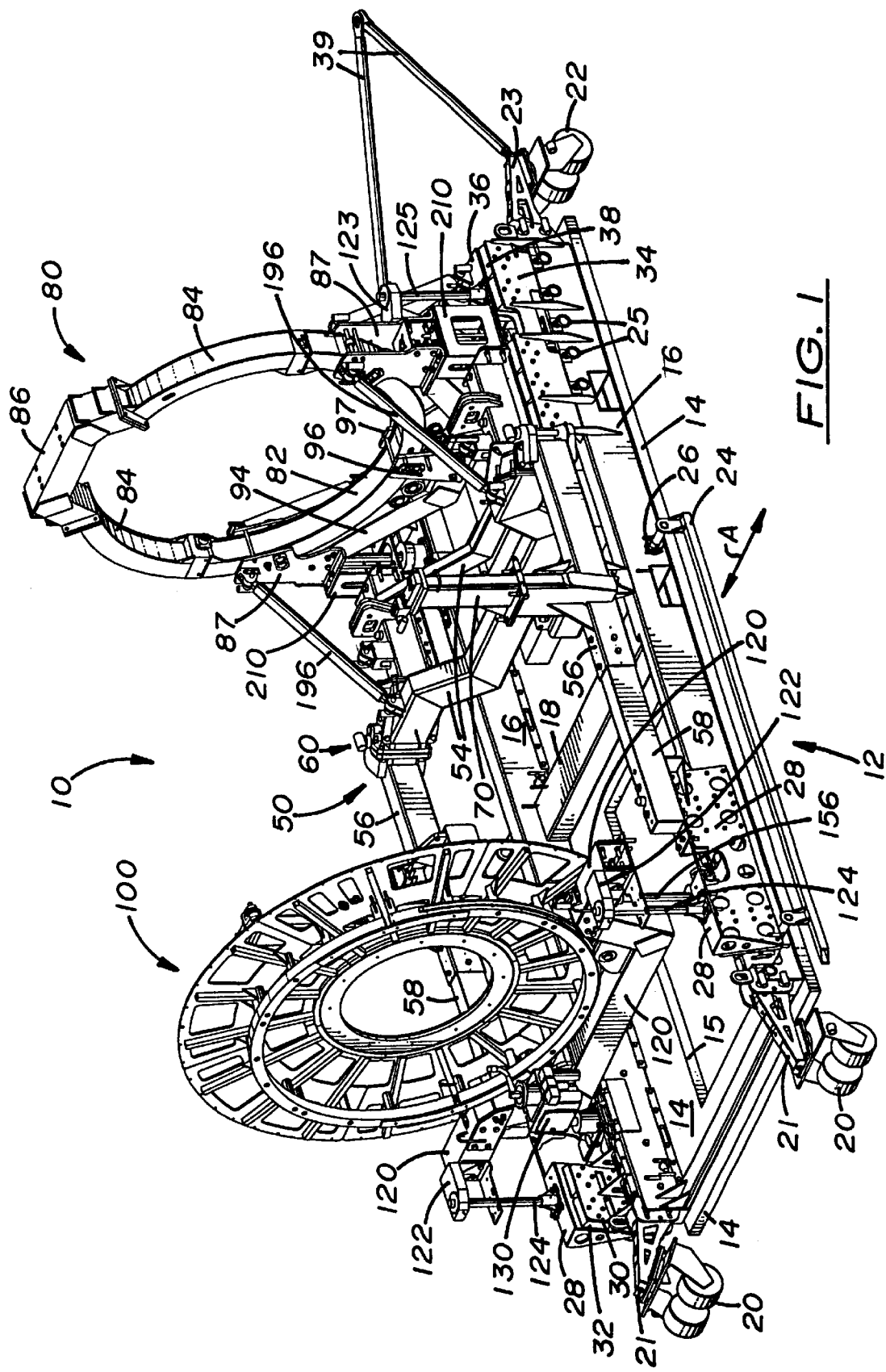
FIG. 1 is a front perspective view of a preferred embodiment of the shipping system of this invention illustrating the forward ring mounted to the shipping system, and the cradle arms rotated in the truck transport mode.

This description of the invention is separated into two parts, namely, a description of the structure of the shipping system and a description of the operation of the shipping system.

A. Shipping System Structure

In accordance with the aircraft shipping system 10 of this invention as best seen in FIGS. 1, 2, 11 and 12, the shipping system includes a frame assembly 12 having a pair of laterally spaced and longitudinally extending frame members 16 connected by transverse support members 18. The lower portion of the frame assembly is defined by shipping stand pallet 14 which is attached to the bottom surface of longitudinal members 16. The forward end of the pallet 14 includes a large opening 15. The forward end of the frame assembly includes a pair of forward casters 20 which attach to the frame assembly by forward caster mounts 21. Similarly, the aft end of frame assembly 12 includes a pair of aft casters 22 which are attached to the frame assembly by means of aft caster mounts 23. Depending upon whether the shipping system is placed in the truck or air transport mode, the forward and aft casters may be completely removed, or may be retracted. A guide rail assembly 24 protrudes laterally from each of the longitudinal members 16 and connects to the longitudinal members 16 by means of guide rail holders 26. The guide rail assembly 24 is used to align the shipping system as it is loaded onto an aircraft. As shown by the directional arrow A in FIG. 1, the guide rail assembly 24 may be extended for operation, or may be pushed inward in a stowed position when not in use. A plurality of tie down rings 25 may be attached to the frame assembly enabling it to be secured inside the aircraft. Although the Figures only illustrate rings 25 near the aft end of the shipping system, it will be understood that rings 25 can be interspersed along the entire length of the shipping system as necessary.

As best seen in FIGS. 1, 2 and 20–22, the shipping system includes a shock absorption assembly which enables an aircraft engine loaded on the cradle assembly to receive shock absorption in both the truck and air transport modes. The forward end of the shipping frame 12 includes a pair of forward shock mounts 28 having upper surfaces which serve to support forward yoke 120, when lowered, and forward jack stabilizer rods 124. An inner support bracket 30 is welded at each forward end of the longitudinal members 16. A plurality of shock pads 32 are mounted between the inner support brackets 30 and the shock mounts 28. The aft ends of each of the longitudinal members 16 also include shock absorption protection means. Outer support brackets 34 are welded to the longitudinal members 16. Aft shock mounts 36 are placed adjacent to the outer support brackets 34 and aft shock pads 38 are held therebetween. As discussed in more detail below, the aft yoke assembly 80 and aft yoke/ring connecting brackets 87 mount to the upper surfaces of shock mounts 36 as well as the aft jack stabilizer rods 125.

Figure 20:
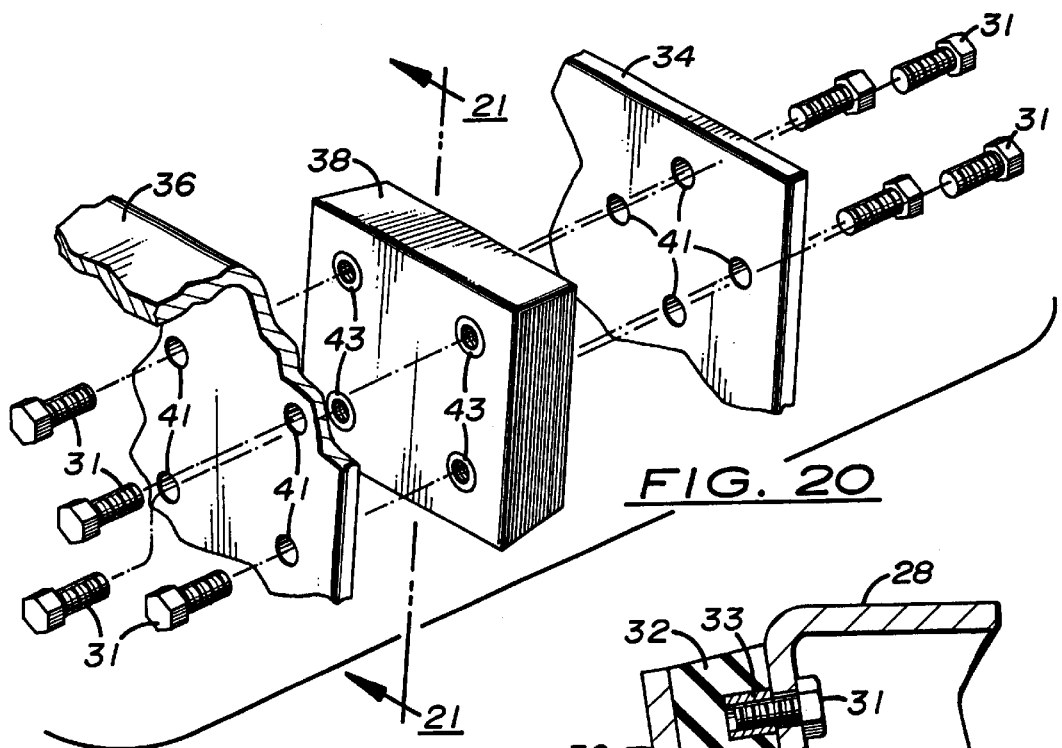
FIG. 20 is an enlarged fragmentary exploded perspective view of one portion of the shock absorbing assembly including the aft shock pads.
Figure 22:
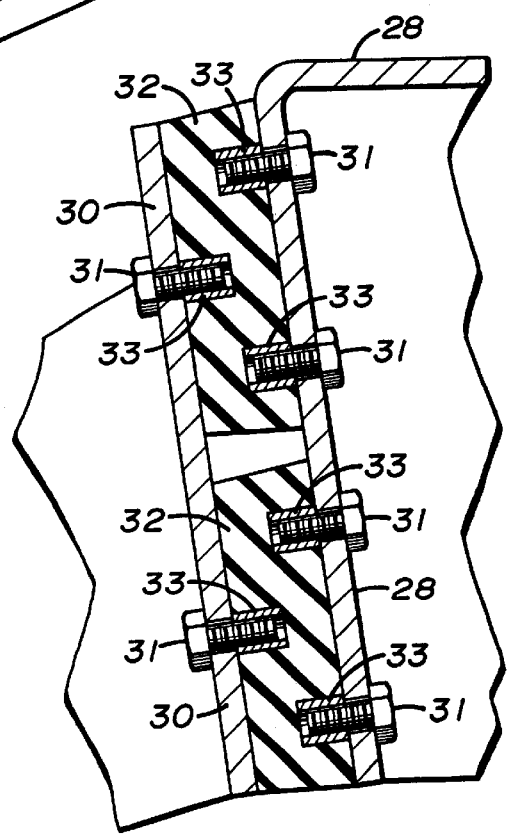
FIG. 22 is a fragmentary vertical section of the forward shock pads as they appear when installed.
Figure 21:
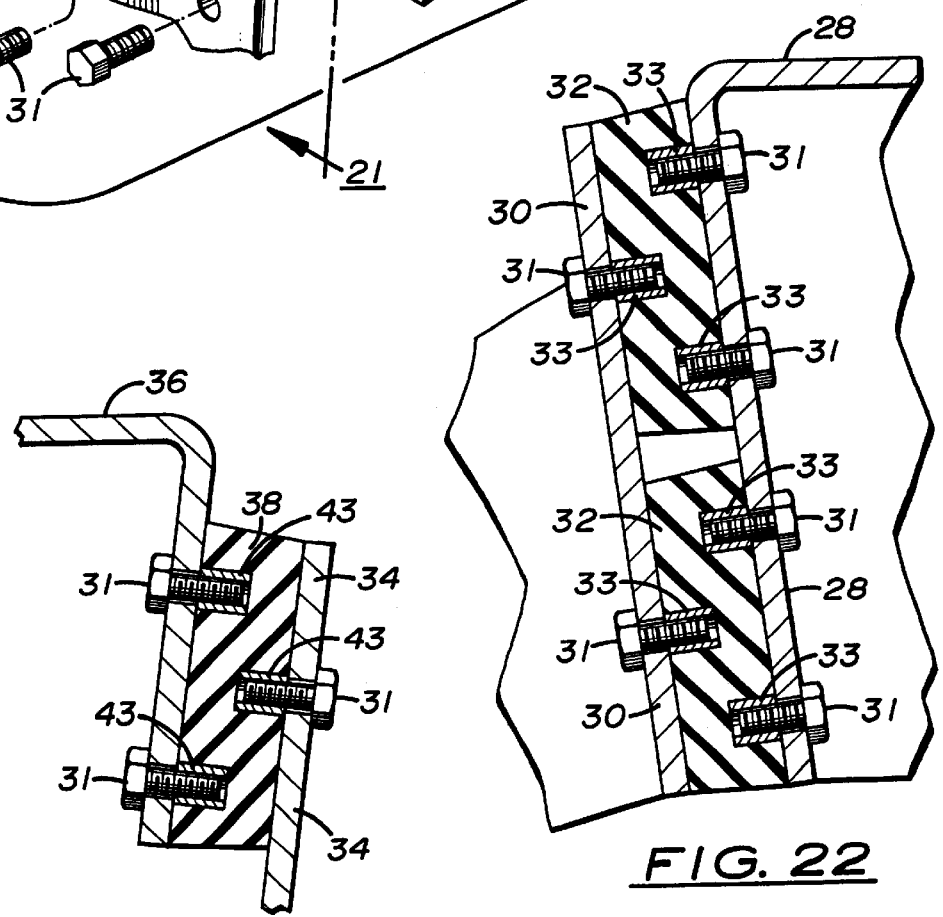
FIG. 21 is a fragmentary vertical section taken along line 21—21 of FIG. 20 showing the aft shock pads as they appear when installed.

As shown best in FIGS. 20 and 21, aft shock pads 38 are secured between shock mounts 36 and brackets 34 by a plurality of bolts or fasteners 31 which extend through openings 41 which may be drilled in shock mounts 36 and brackets 34. Shock pads 38 each include a plurality of threaded wells 43 which receive the fasteners 31. At the aft end of each of the longitudinal members 16, one row of five shock pads 38 are utilized to provide shock absorption protection. As shown in FIG. 22, the forward end of the shipping system may include two rows of shock pads 32. In the preferred embodiment, each of the two rows at the forward end includes a set of four shock pads 32. Shock pads 32 are mounted between shock mounts 28 and brackets 30 in the same manner as the aft shock pads are mounted to their corresponding hardware. That is, each of the shock pads 32 includes respective threaded wells 33 which receive the plurality of fasteners 31. The shock pads 32 and 38 isolate the cradle assembly from the frame assembly components which carry the load of the aircraft engine to the ground. The number and spacing of the shock pads 32 and 38 may be adjusted as necessary to provide the desired type of dampening and shock absorption effect to the loaded aircraft engine.

Referring back to FIGS. 2 and 3, a tow bar 39 may be attached at the aft end of the frame assembly in order that the shipping assembly may be pulled by a vehicle. The transport of the shipping system by the tow bar is only intended to be used for short distances, such as movement of the shipping system around an airfield or work area.

The next major assembly of the shipping system of this invention is the cradle assembly. The cradle assembly is shown mounted to the frame assembly in FIGS. 1–9, and separated from the frame assembly in FIG. 26. In broad terms, the cradle assembly is used to secure the aircraft engine when the cradle assembly is mounted on the frame assembly, and further allows the shipping system to be configured in either a truck transport mode or air transport mode. The cradle assembly may be completely disconnected from the frame assembly during bootstrap operations as further discussed below. The cradle assembly may be defined as including the cradle frame group 50, the aft ring 80, the aft yoke assembly 94, the forward ring 100, and the forward yoke assembly 120.

Figure 16:
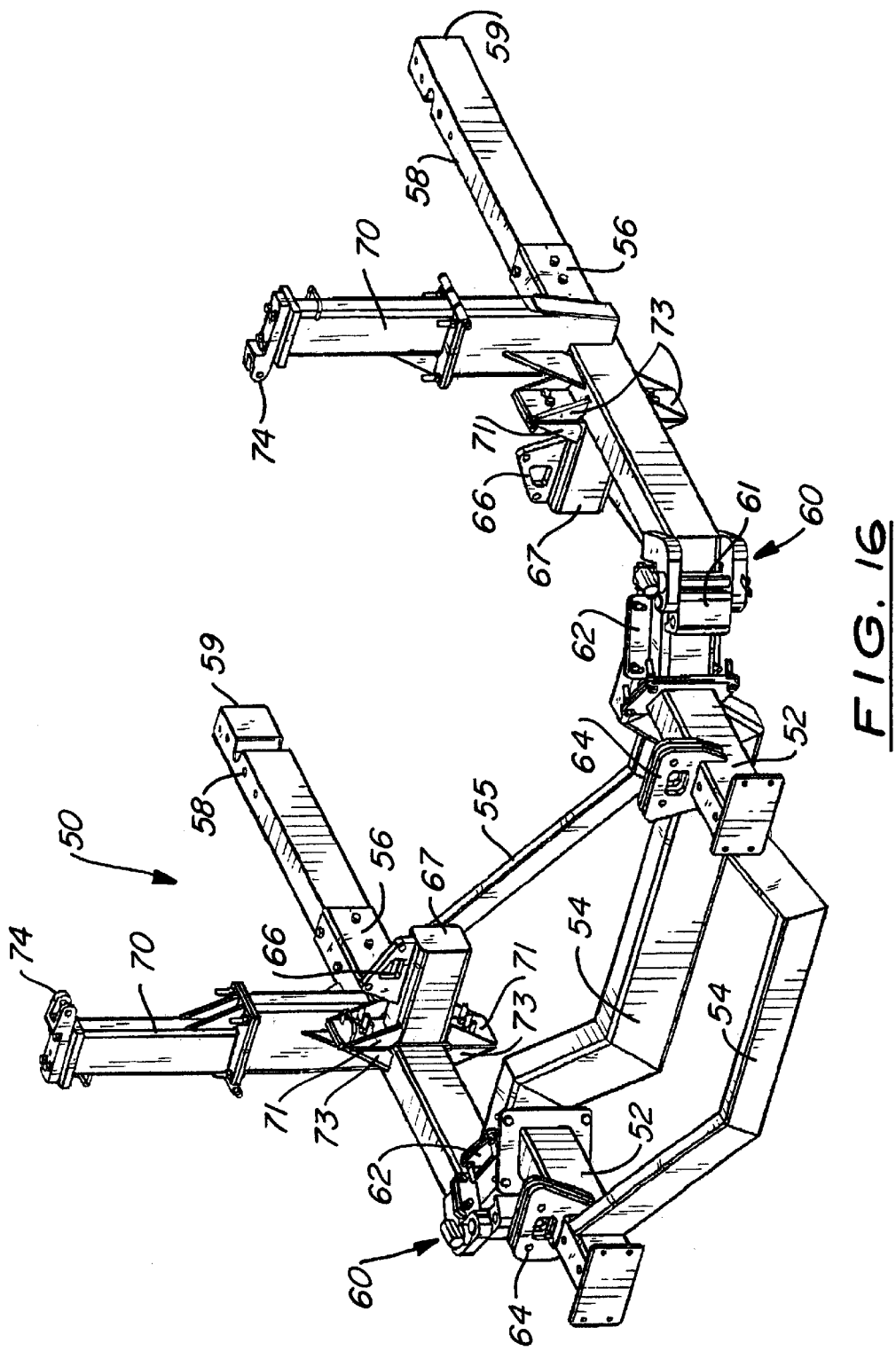
FIG. 16 is an enlarged perspective view of the cradle frame group as it appears in the truck transport mode.
Figure 17:
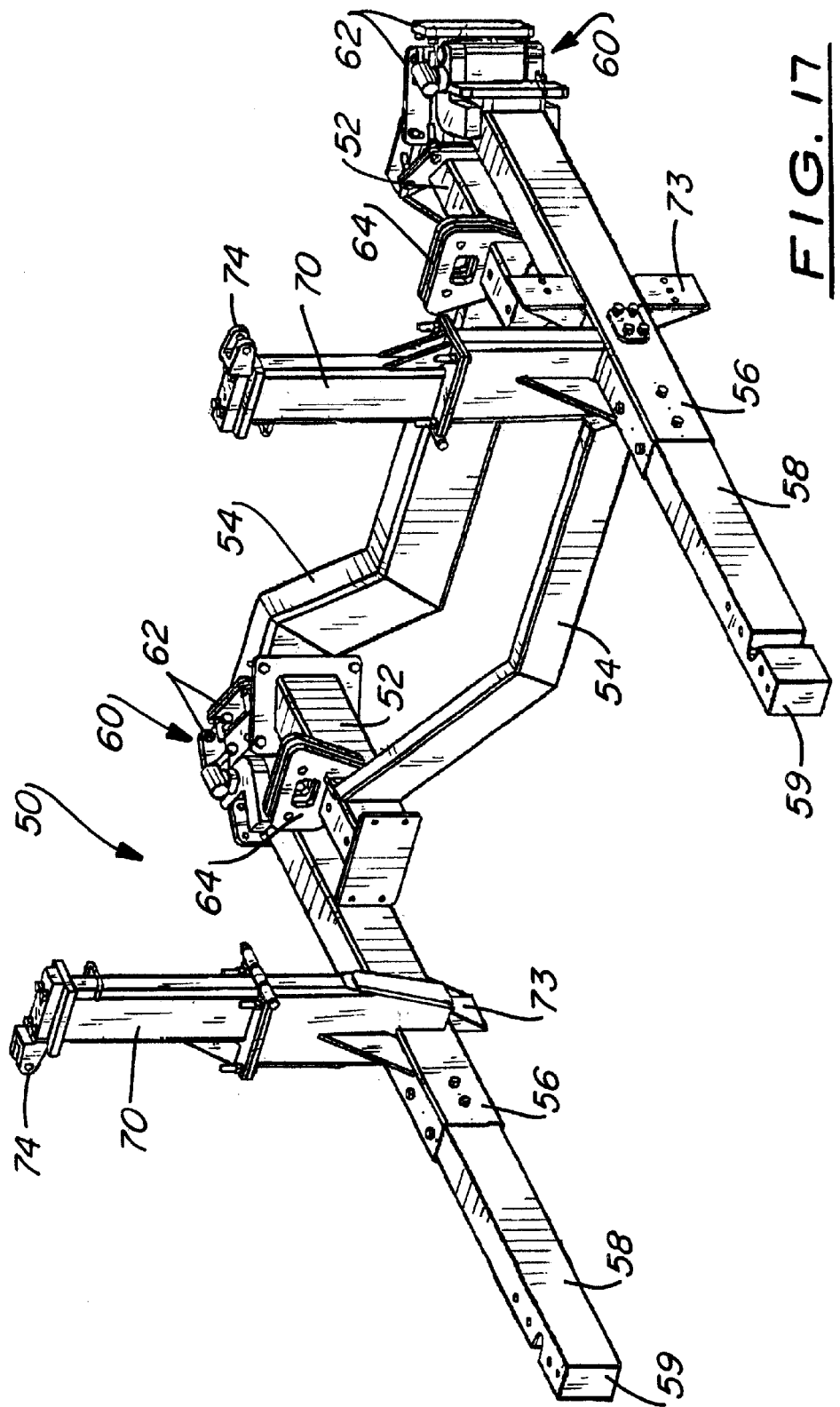
FIG. 17 is another perspective view of the cradle frame group illustrating the cradle arms rotated 180°.
Figure 18:
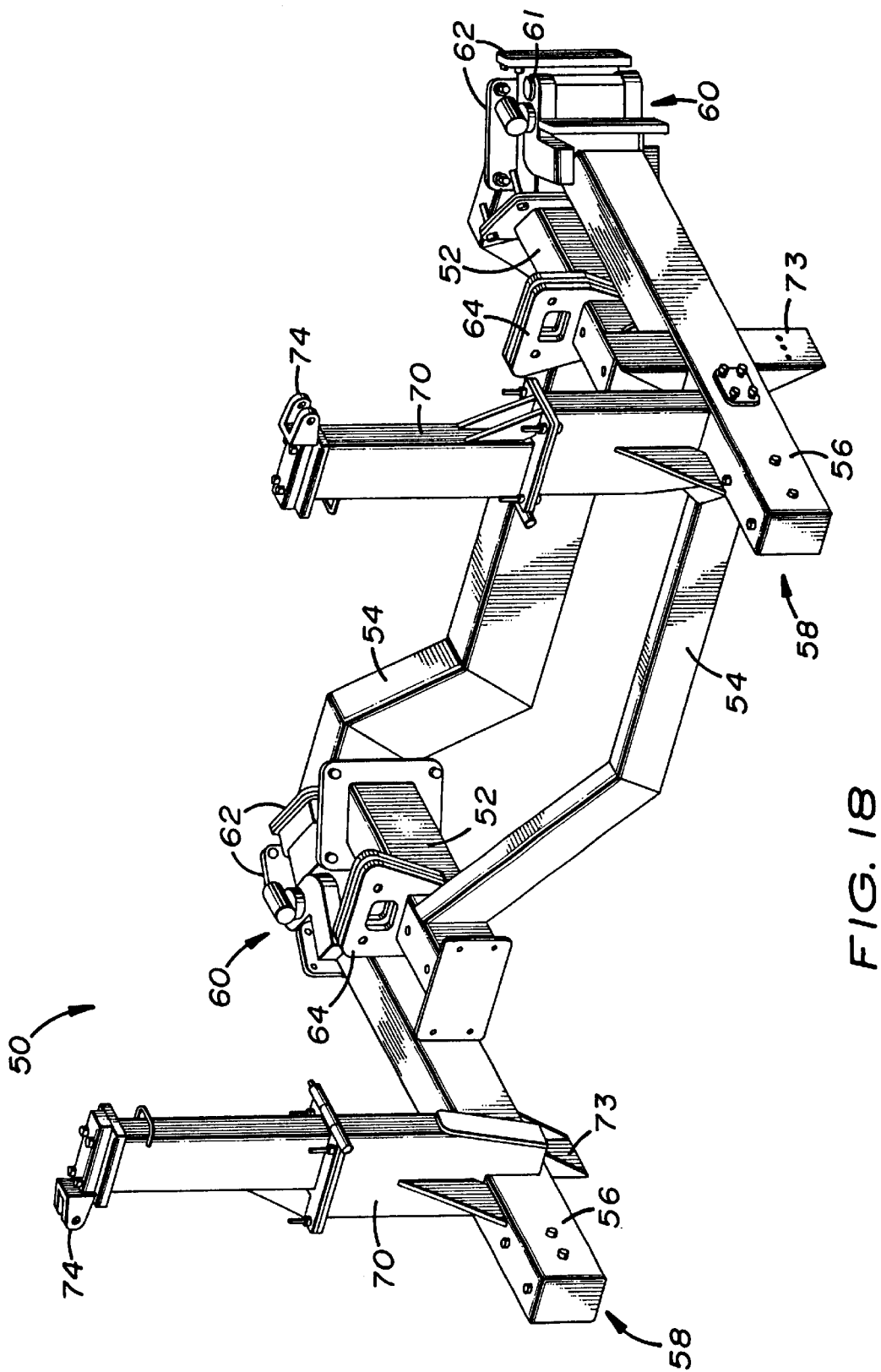
FIG. 18 is another perspective view of the cradle frame group as it appears in the truck transport mode.

Cradle frame group 50 shown in isolation at FIGS. 16–18 includes aft longitudinal members 52 which are separated from the forward longitudinal members 56 by hinge assemblies 60. Each longitudinal member 56 has a telescoping section 58. The longitudinal members 52 and 56 are interconnected by a plurality of transverse support members 54 and a removable diagonal support member 55. In the truck transport mode, the cradle frame group 50 mounts to the frame assembly wherein the telescoping sections 58 rest upon the upper surfaces of shock mounts 28, and the aft longitudinal members 52 rest upon the upper surfaces of aft shock mounts 36. FIG. 16 illustrates the cradle frame group when the shipping system is placed in the truck transport mode. In this particular mode, telescoping sections 58 are extended and ends 59 are connected to shock mounts 28. FIG. 17 illustrates the cradle frame group 50 when the shipping system is transitioned to the air transport mode. Ends 59 are disconnected from shock mounts 28 and are then rotated about their corresponding hinge assemblies 60. Diagonal support member 55 is also removed. FIG. 18 shows the cradle frame group 50 configured in the air transport mode wherein telescoping sections 58 have been pushed and secured inside their corresponding longitudinal members 56. Each hinge assembly 60 includes a hinge pin 61 which enables longitudinal members 56 and cradle arms 70 to rotate. Prior to rotation, the bolts/fasteners are removed which connect opposing hinge plates 62. As shown in FIGS. 17 and 18, the opposing hinge plates 62 become separated as the longitudinal members 56 are rotated.

Figure 26:
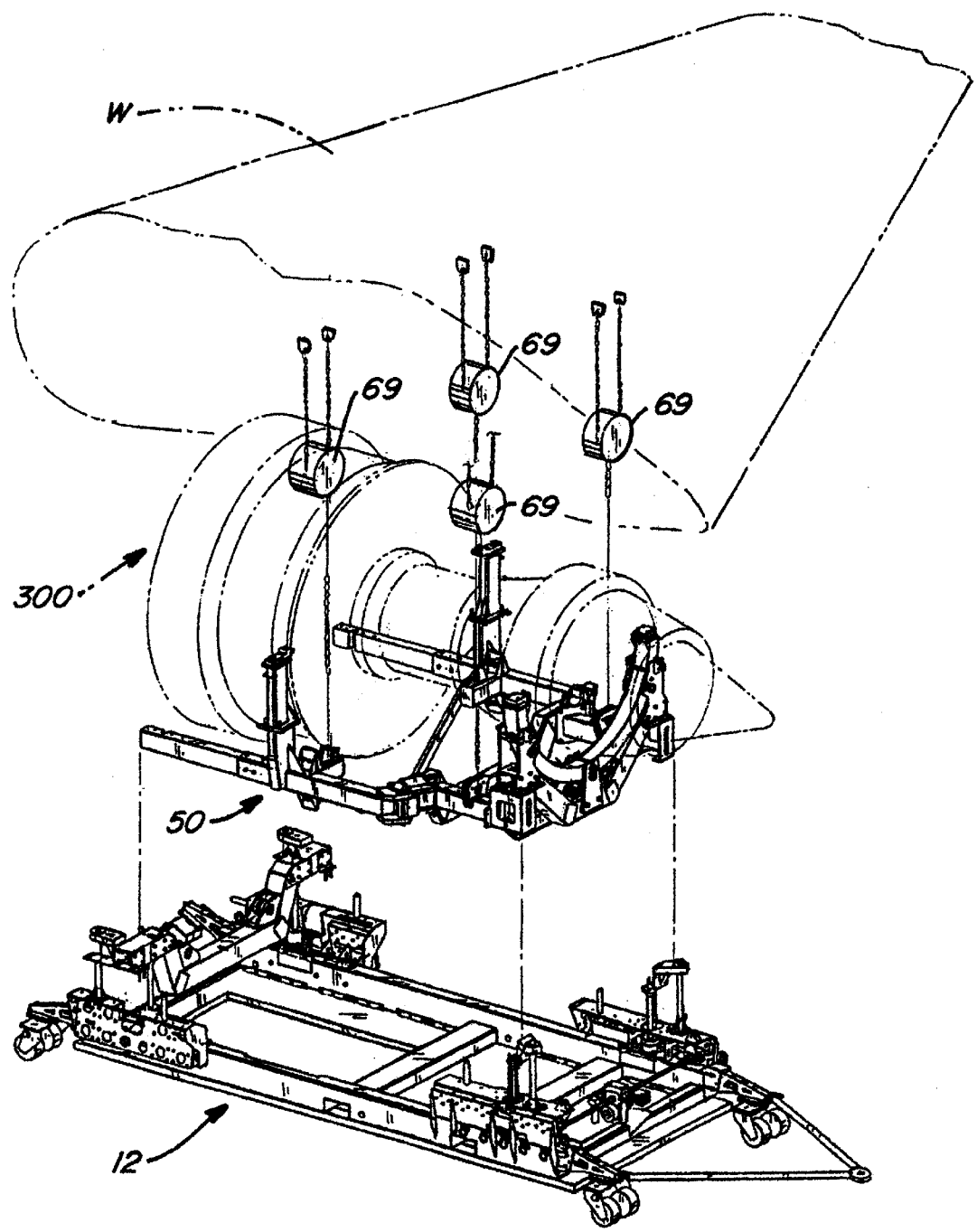
FIG. 26 is a perspective view of an aircraft engine during bootstrap operations wherein the cradle assembly has been separated from the frame assembly, and the cradle assembly is hung from underneath the wing of the aircraft.

Now also referring to FIG. 26, the cradle assembly as well as the entire shipping system (when the cradle assembly is attached to the frame assembly) may be raised or lowered by a chain/pulley system 69 which connects to the wing W of the aircraft. The raising and lowering of the cradle assembly/ shipping system under the wing of an aircraft for purposes of raising or lowering the aircraft engine 300 to be mounted or removed from the aircraft is known in the industry as "bootstrap" operations. During these bootstrap operations, there are four points on the cradle frame group 50 which are used to connect the shipping system to the chain/pulley system 69. Specifically, there are two forward bootstrap connections 66, and two aft bootstrap connections 64.FIGS. 17 and 18 illustrate the forward bootstrap connections 66 being removed from the cradle group 50. Otherwise, connections 66 would protrude away from the shipping system in an undesirable manner which could interfere with loading of the aircraft engine 300 onto an aircraft. Bootstrap connections 66 are mounted to the cradle group 50 by means of short transverse members 67 with integral gusset plates 71 which mate with gusset plates 73 of longitudinal members 56. These bootstrap operations will be discussed below in more detail with the respect to the methods of this invention.

Still referring to FIGS. 16–18, cradle arms 70 are provided to connect the cradle assembly to the forward end of the aircraft engine. The cradle arms 70 attach at their lower ends to the corresponding longitudinal members 56. The cradle arms 70 each includes a pin/spherical bearing connector 74 which is the point of attachment for connection to the forward aircraft engine mounts 308, and which can be seen as exposed in FIGS. 19A and 19B. The use of the cradle arms 70 to secure the cradle frame group to the aircraft engine is only necessary in the truck transport mode and when securing the aircraft engine during bootstrap operations.

Figure 2:
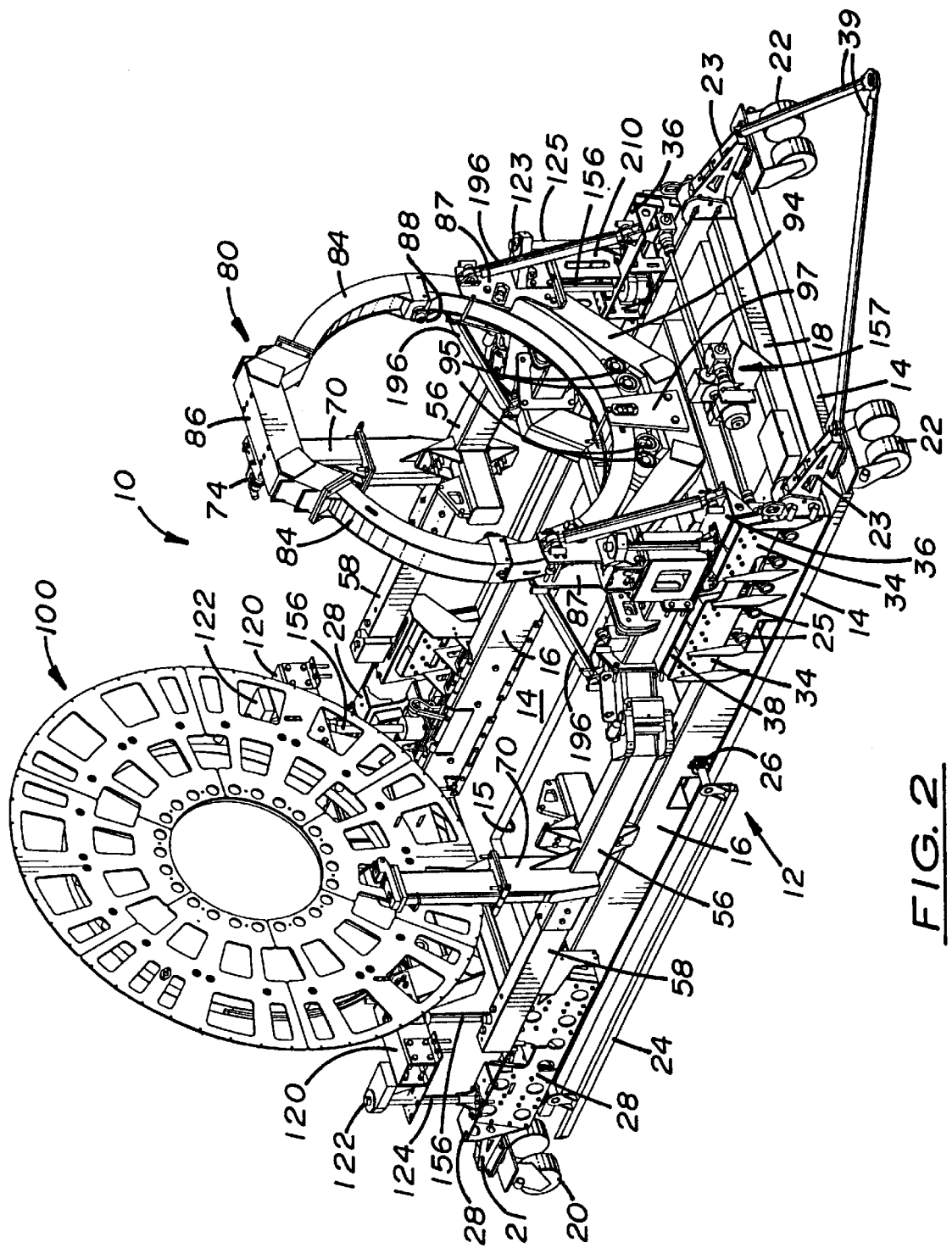
FIG. 2 is a rear perspective view of the preferred embodiment of the shipping stand of this invention further illustrating the forward ring mounted to the shipping system, and the cradle arms placed in the truck transport mode.
Figure 3:
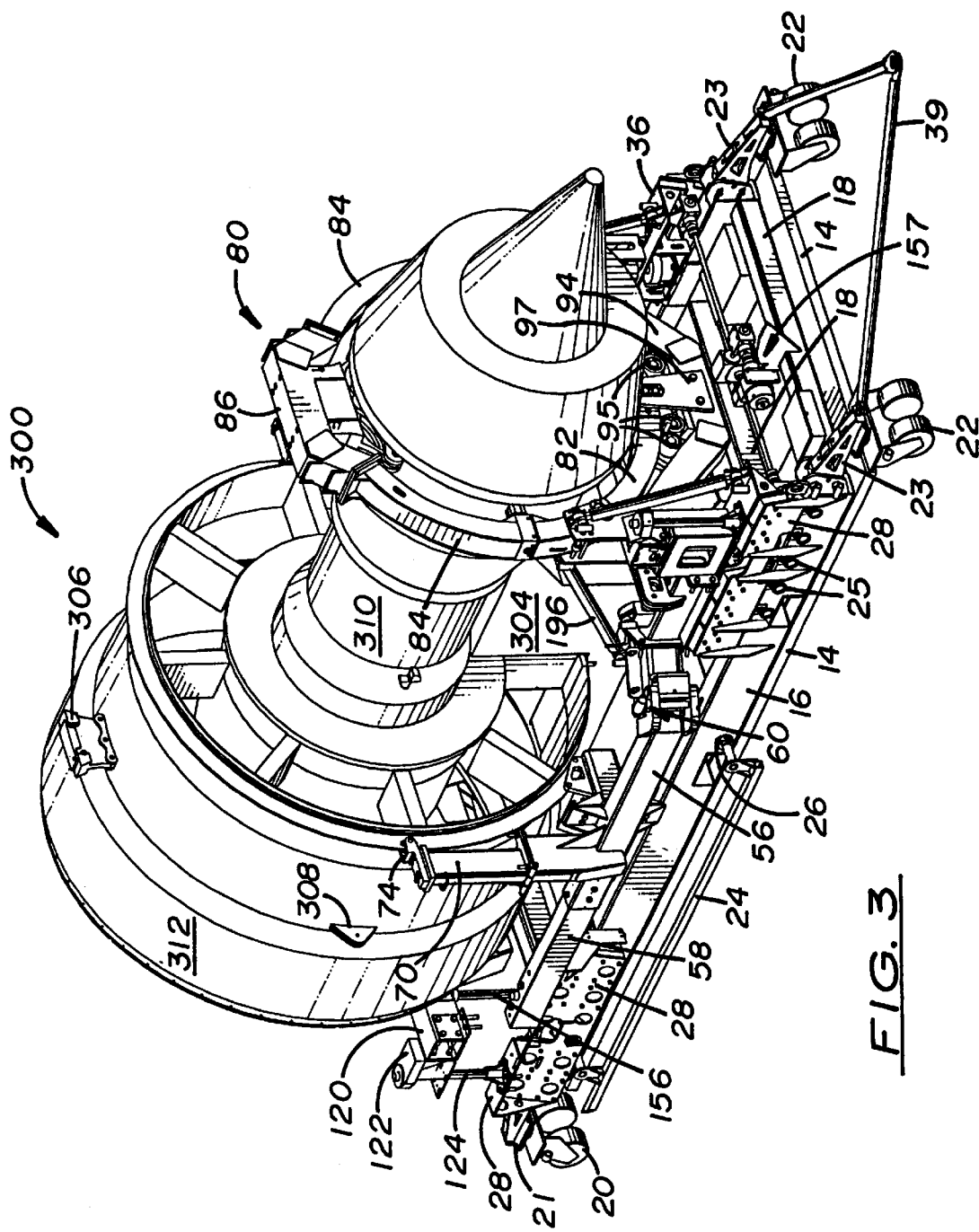
FIG. 3 is another rear perspective view of the shipping system of this invention as also shown in FIG. 2, but further illustrating a jet aircraft engine mounted on the shipping system as the shipping system is configured in the truck transport mode.

In both the truck transport mode and air transport mode, the aft end of the aircraft engine is secured by some portion of the aft ring 80. As best seen in FIGS. 1, 2, and FIG. 19, the aft ring 80 includes four primary components, namely, lower aft ring portion 82, two intermediate aft ring portions 84, and upper aft ring portion 86. When the cradle assembly secures an aircraft engine in a bootstrap operation, the intermediate aft ring portions 84 and the upper aft ring portion 86 are removed enabling the aft end of the aircraft engine to be cradled and secured by the lower aft ring portion 82. As shown in FIGS. 1–3, 5 and 24, the aft ring 80 mounts to the shipping system at three locations on the lower aft ring portion 82, namely, at opposing sides of the upturned ends of the lower aft ring portion 82 by means of aft yoke/ring connecting brackets 87, and at the lower end of the lower aft ring portion 82 by means of connection with the aft yoke/ring support brackets 96 and 97. If it is necessary to use the air transport mode, the intermediate and upper aft rings may be assembled to the lower aft ring.

Figure 4:
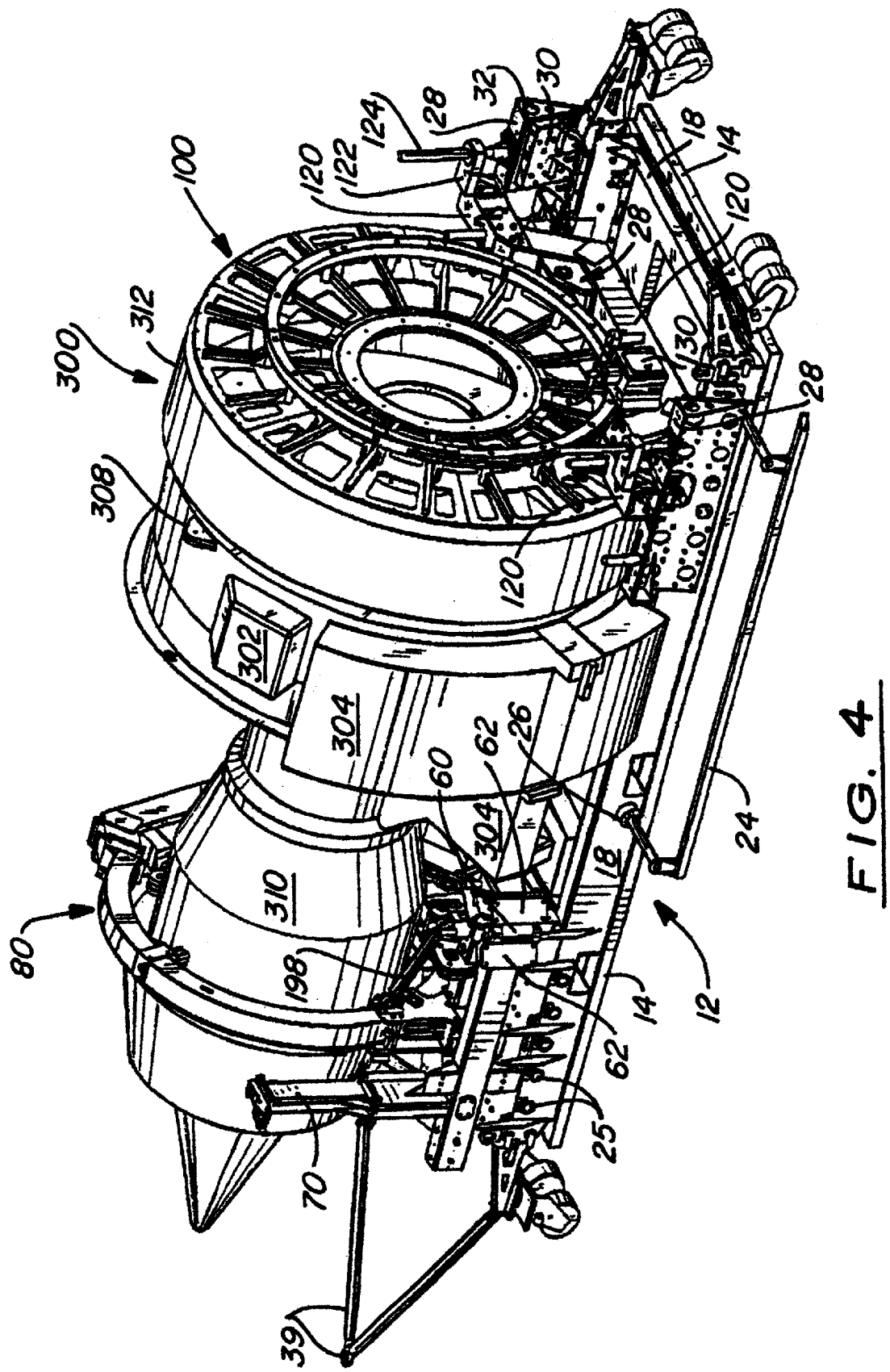
FIG. 4 is another front perspective view of the shipping system of this invention as also shown in FIG. 1, but further illustrating a jet aircraft engine mounted on the shipping system as the shipping system is configured in the air transport mode.
Figure 5:
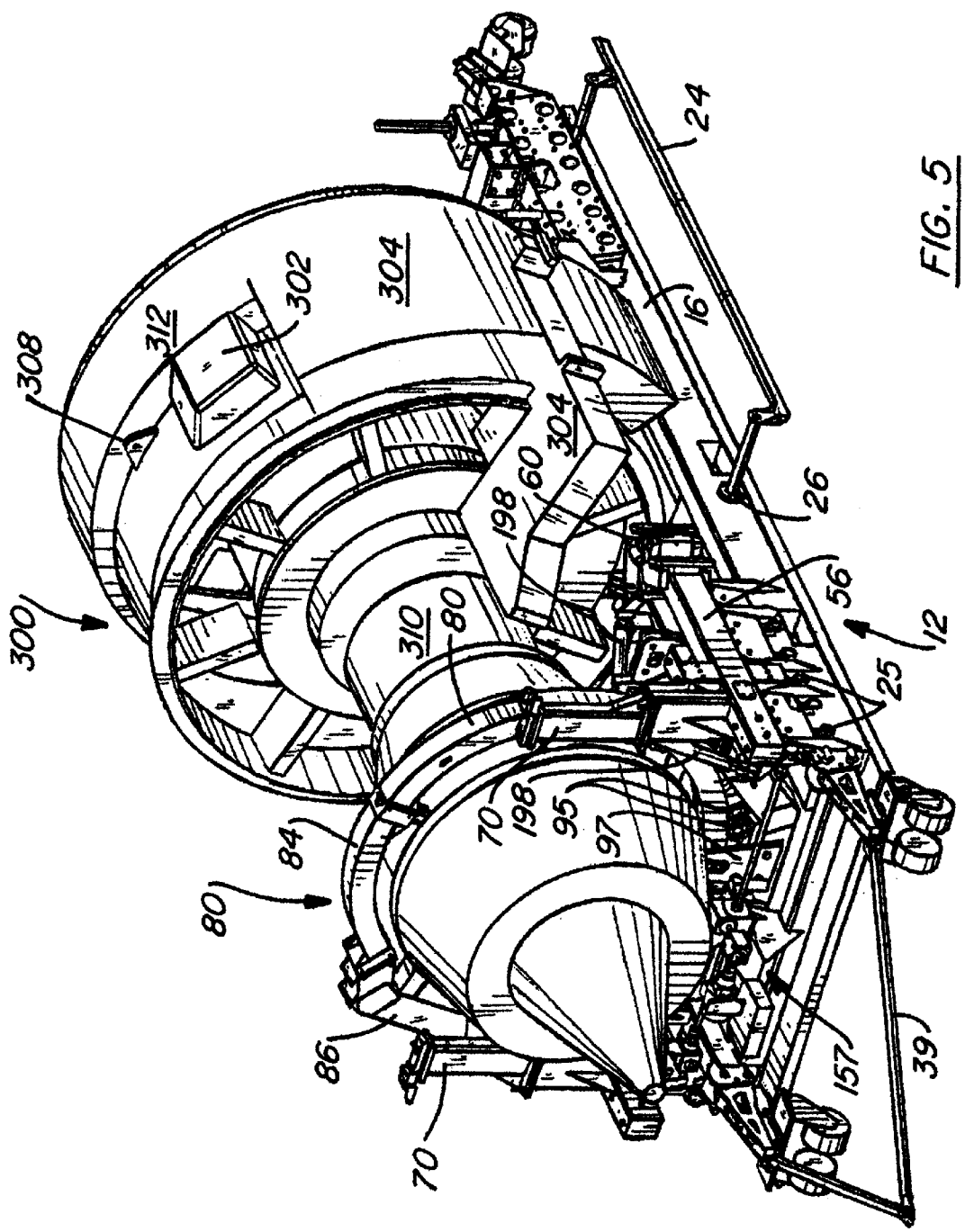
FIG. 5 is another rear perspective view of the shipping system of this invention also shown in FIG. 3 illustrating the jet aircraft engine mounted on the shipping system as it is configured in the air transport mode.
Figure 19B:
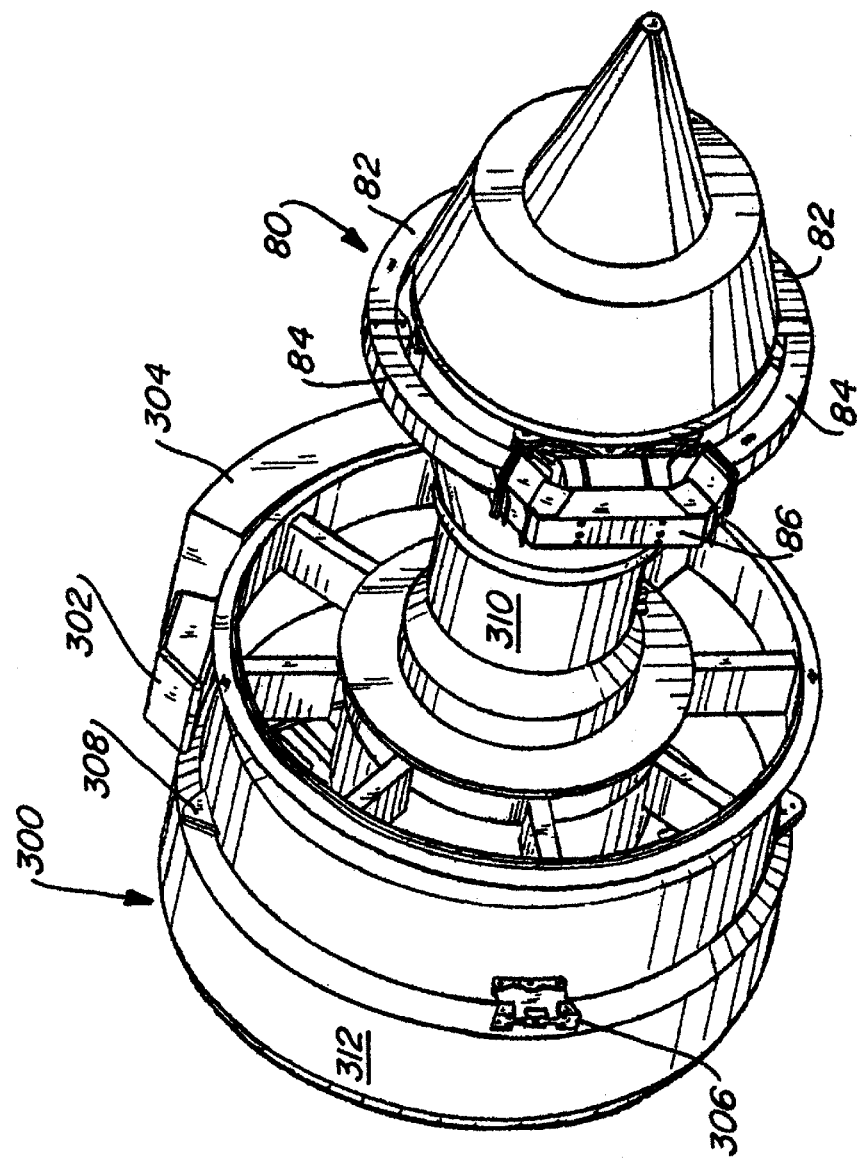
FIG. 19B is an enlarged perspective view illustrating the aft ring assembly filly assembled and connected to the aircraft engine, and also showing the aircraft engine rotated as in the air transport mode.
Figure 19:
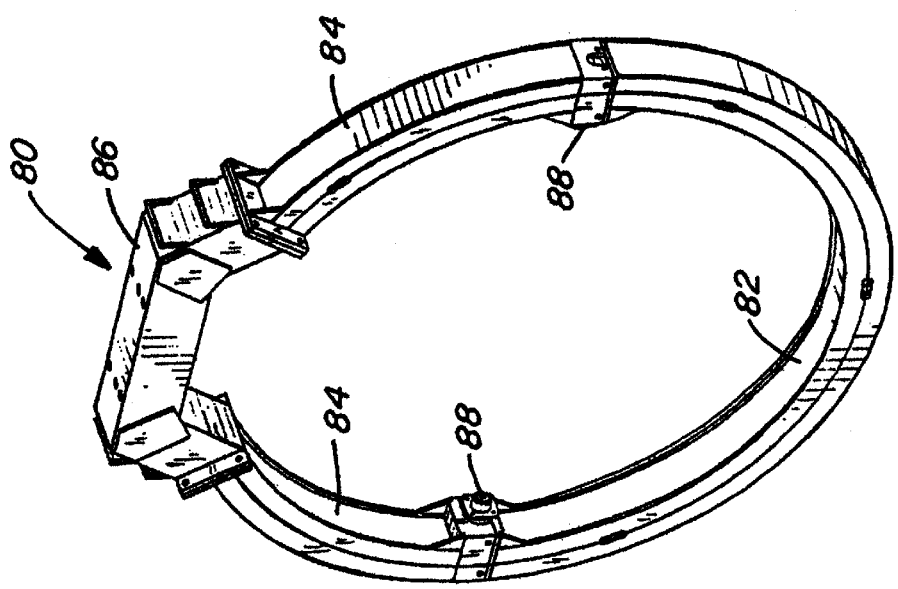
FIG. 19 is an enlarged perspective view of the aft ring assembly.
Figure 19A:
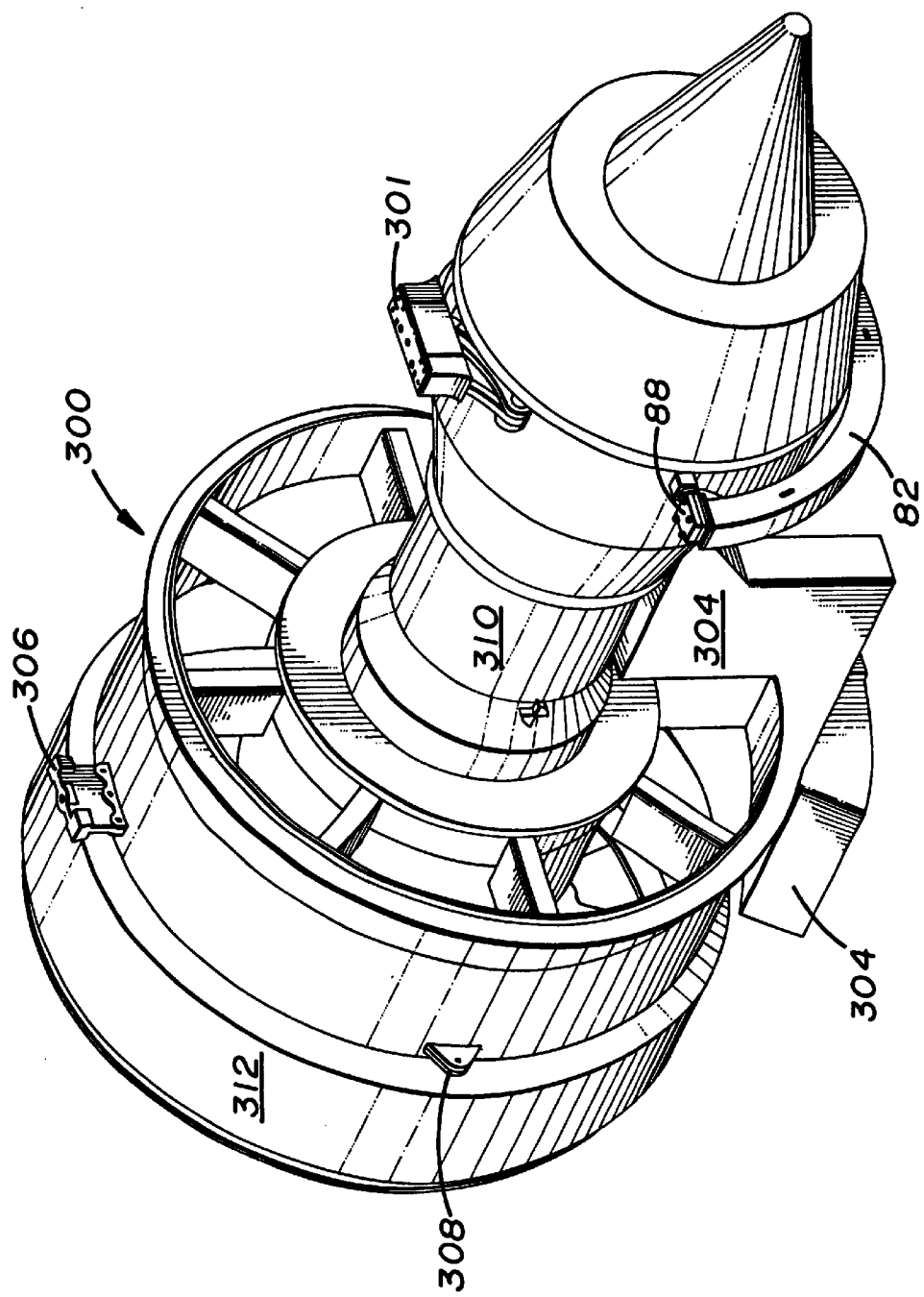
FIG. 19A is an enlarged perspective view of the lower aft ring portion connected to the aircraft engine.

As shown in FIGS. 1 and 2,the aft ring may be rotated from the normal position to the rotated air transport mode position as shown in FIGS. 4, 5 and 19B. FIG. 19A illustrates the truck transport mode wherein only the lower aft ring portion 82 is used to secure the aft end of the aircraft engine 300, thus exposing aft flight mount 301. When the aft ring 80 is assembled, the aft flight mount 301 of the aircraft engine is bolted to the upper aft ring portion 86. The aft ring 80 further includes a pair of stanchion pin connections 88. These pin connections mate with the internal aft or stanchion engine mounts (not shown) of the aircraft engine. The aft ring 80 essentially serves as a collar to secure the aft portion of the aircraft with the stanchion pins 88 acting as the specific points of connection.

Figure 24:
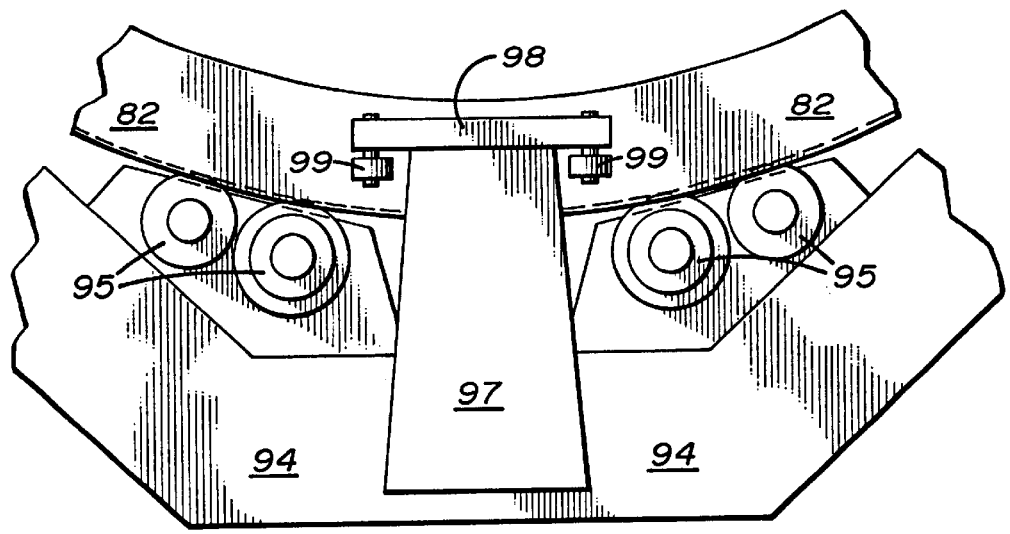
FIG. 24 is an enlarged fragmentary elevation view of the aft yoke and the lower aft ring portion mounted on the aft yoke rollers.

When installed, the lower aft ring portion 82 rests on the aft yoke 94, as best seen in FIGS. 1, 2 and 24. The aft yoke 94 is secured at its opposite ends on aft shock mounts 36 in the air transport mode or on truck spacers 210 in the truck transport mode. The rear and forward sides of the aft yoke 94 include the support brackets 96 and 97 which help to stabilize undesirable movement of the aft ring. A plurality of aft yoke rollers 95 are mounted to the upper surface of the aft yoke 94 which enables the aft ring 80 to be freely rotated when the aft ring is unlocked from brackets 96 and 97, and brackets 87. Brackets 96 and 97 may also include integral upper arms 98 with opposing small rollers 99 which allow the aft ring to freely rotate between the brackets without undue friction. The lower aft ring portion 82 remains attached to the shipping system in both the truck and air transport modes.

When the shipping system is configured in the air transport mode, the forward ring 100 is used to secure the forward end of the aircraft engine 300 in lieu of the cradle arms 70. At least for the Trent 800 aircraft engine, the cradle arms would interfere with the aircraft engine gear box 302 and the protruding external components 304. As shown in FIGS. 19A and 19B, the gear box 302 and the protruding external components 304 are simply shown in a block outline configuration. This block outline configuration represents the clearance area which must be maintained between the aircraft engine 300 and any shipping system which may be used to transport or secure this type of engine.

FIGS. 1 and 2 show the forward ring 100 mounted to the shipping system simultaneous with the cradle arms 70 positioned in the truck transport mode. However, it will be understood that these Figures are provided only to show the major structural elements of the shipping system in a single figure as the forward ring 100 is normally removed when the cradle arms 70 are being used.

Figure 10:
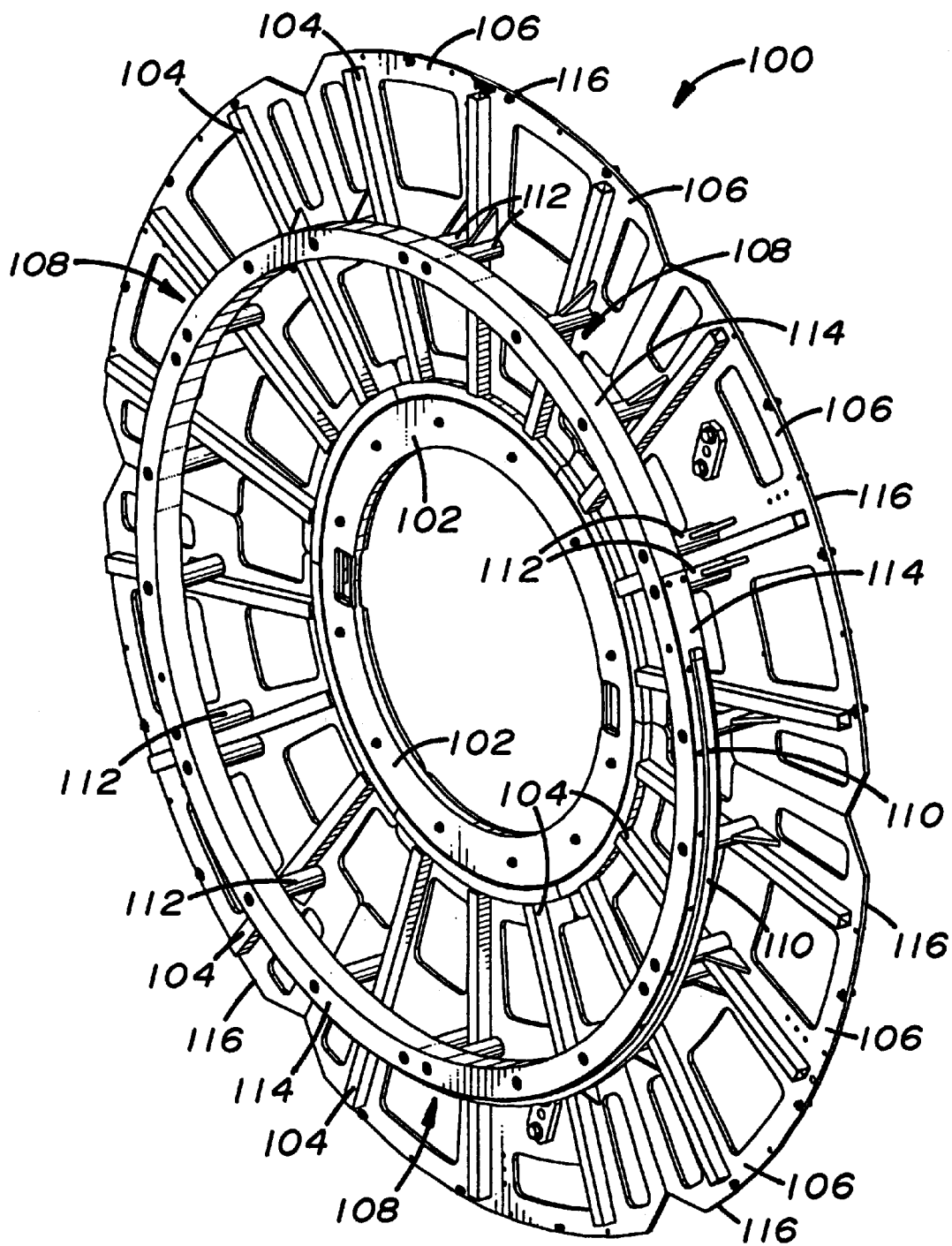
FIG. 10 is an enlarged perspective view of the forward ring.
Figure 11:
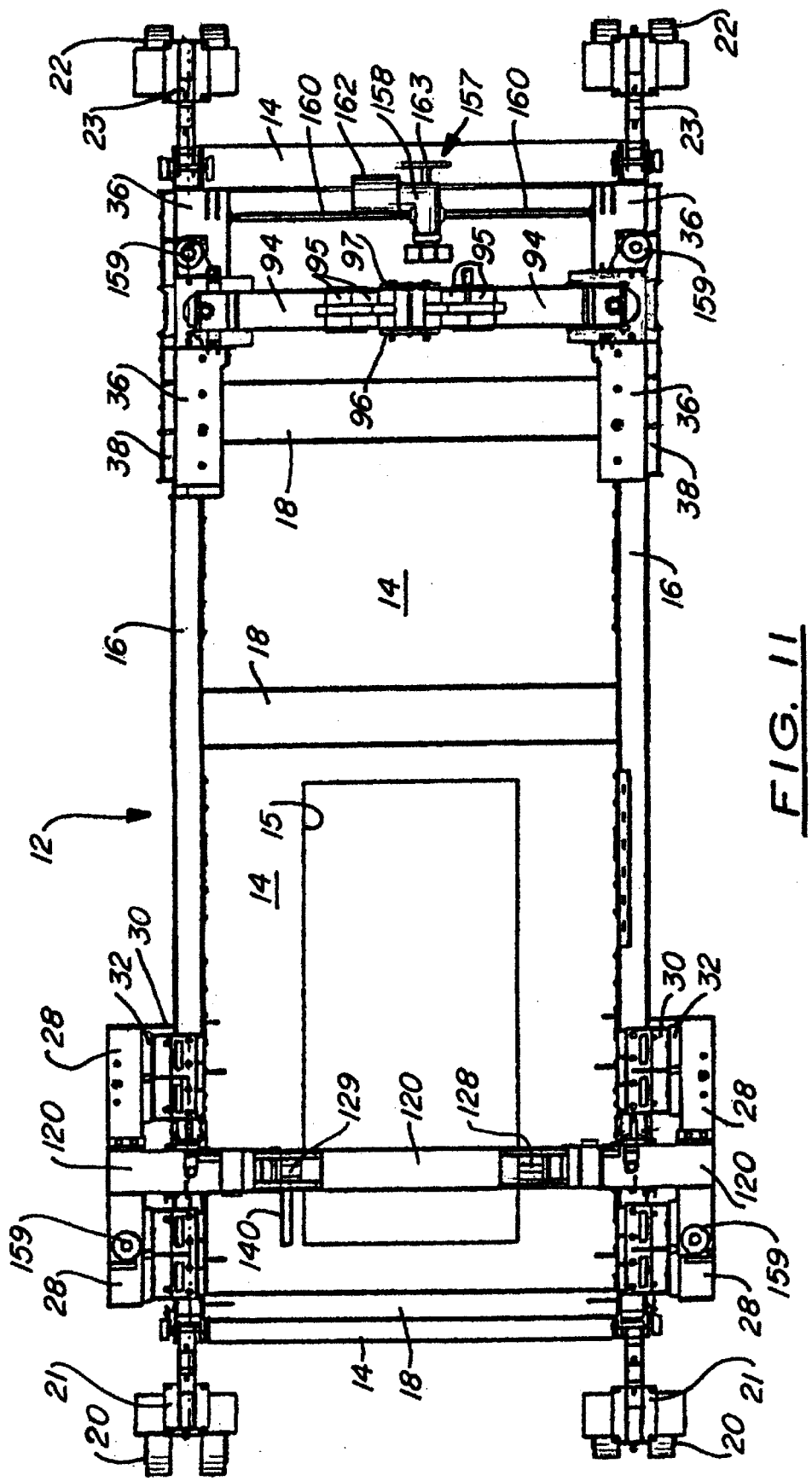
FIG. 11 is a plan view of the frame assembly.
Figure 12:
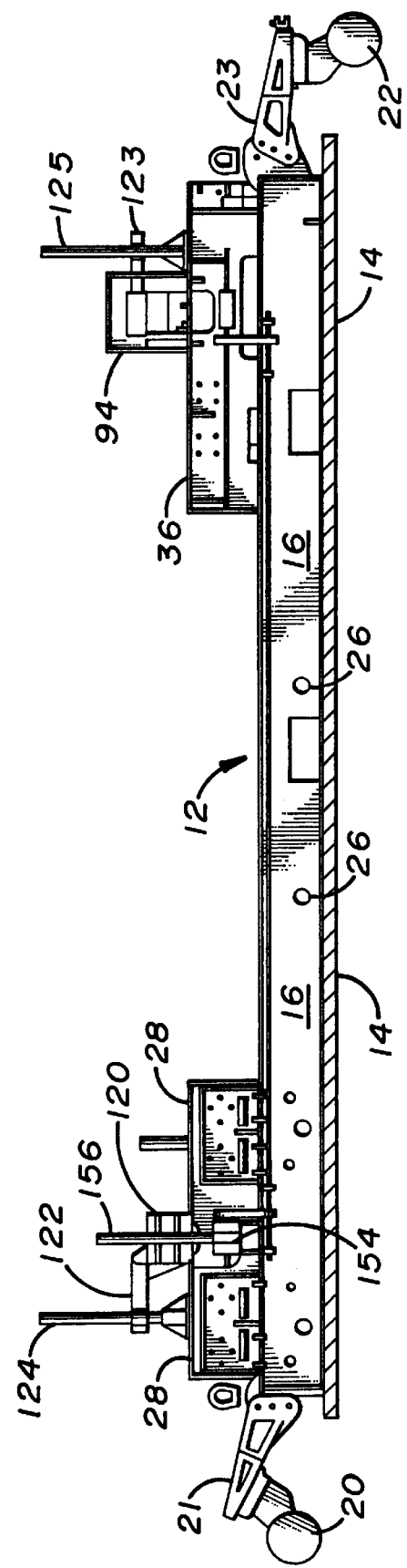
FIG. 12 is an elevation view of the frame assembly.
Figure 13:
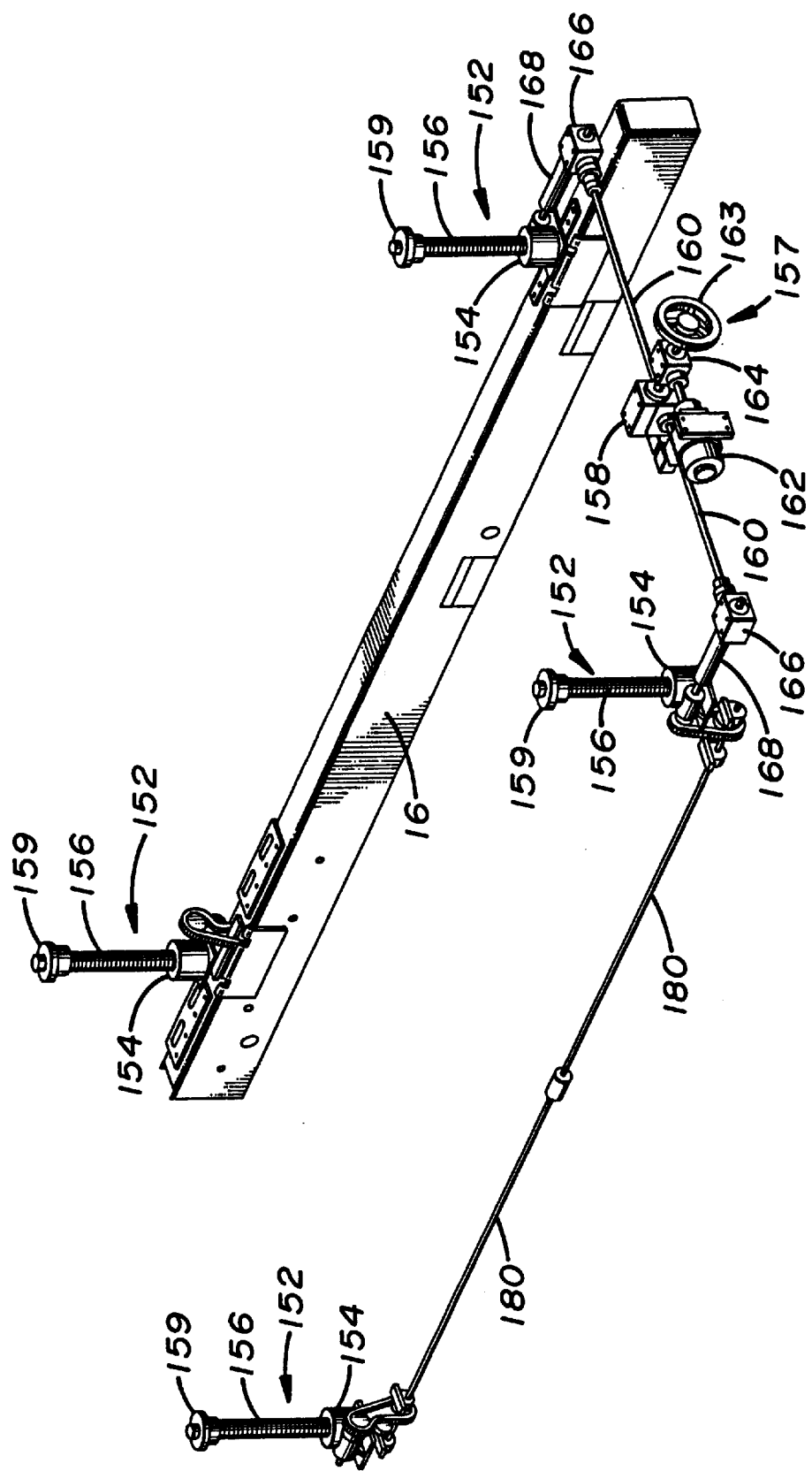
FIG. 13 is an enlarged isolated perspective view of the jack assembly of the invention.

As best seen in FIG. 10, the forward ring 100 includes a hub 102 and a plurality of radial arms 104 extending outward therefrom. A plurality of paddles 106 form a continuous circular shape about hub 102. Paddles 106 are mounted to radial arms 104. A load-bearing ring 108 is offset from paddles 106 and is connected to paddles 106 by weldments 112. The load-bearing ring 108 includes a drive chain 110 which is inset within the peripheral edge 114 of the load-bearing ring and traverses approximately 80° of the circumference of the load-bearing ring 108. As further discussed below, the drive chain 110 cooperates with a drive means for rotating the forward ring. As best seen in FIG. 4, the forward ring 100 is mounted directly to the fan case 312 of the aircraft engine 300 by bolting the peripheral edges 116 of the paddles 106 to corresponding bolt holes (not shown) located on the peripheral edge of the fan case 312.

Figure 8:
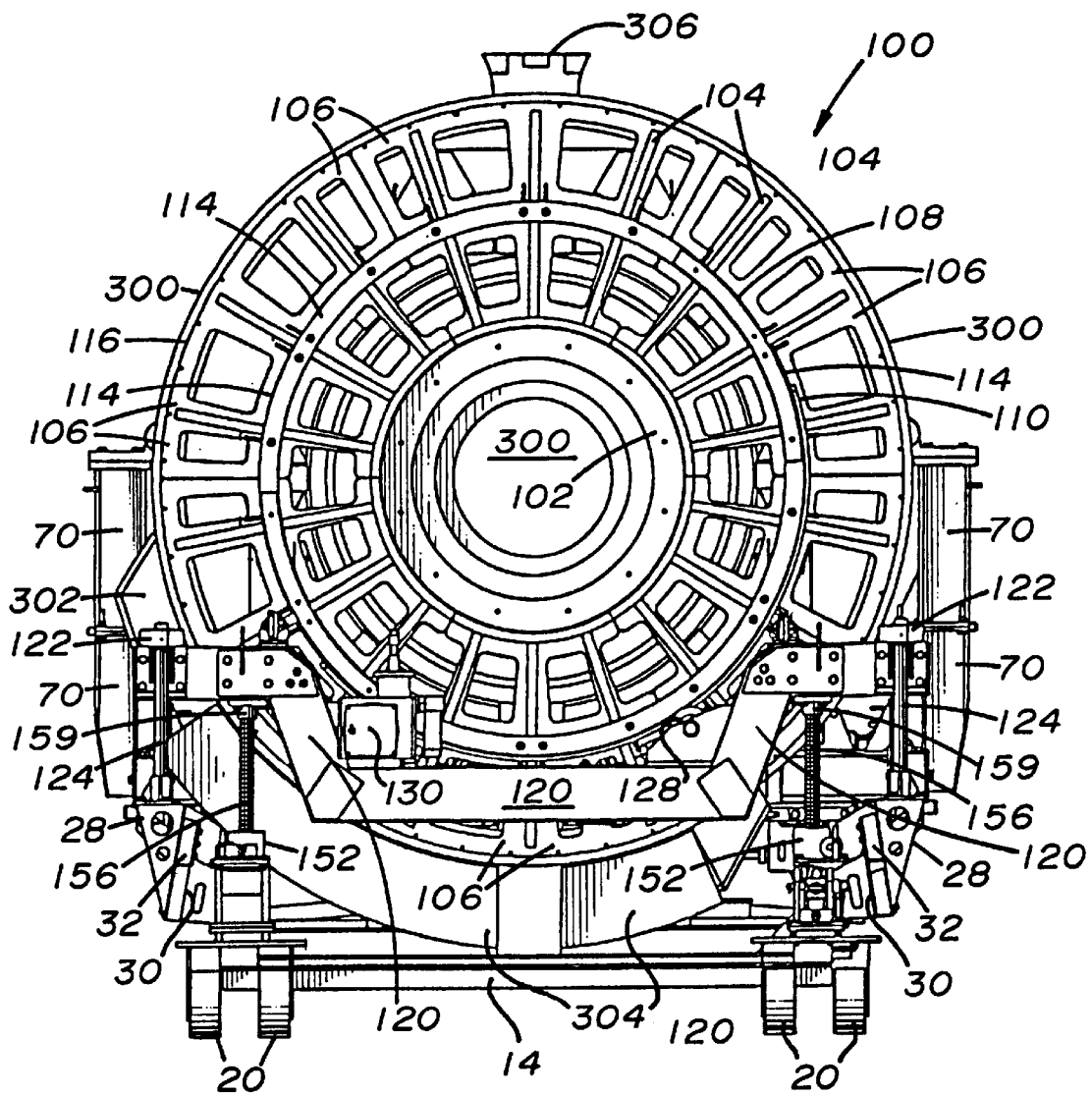
FIG. 8 is a front elevation view of the shipping system including the forward ring and illustrating the aircraft engine loaded on the shipping system.
Figure 9:
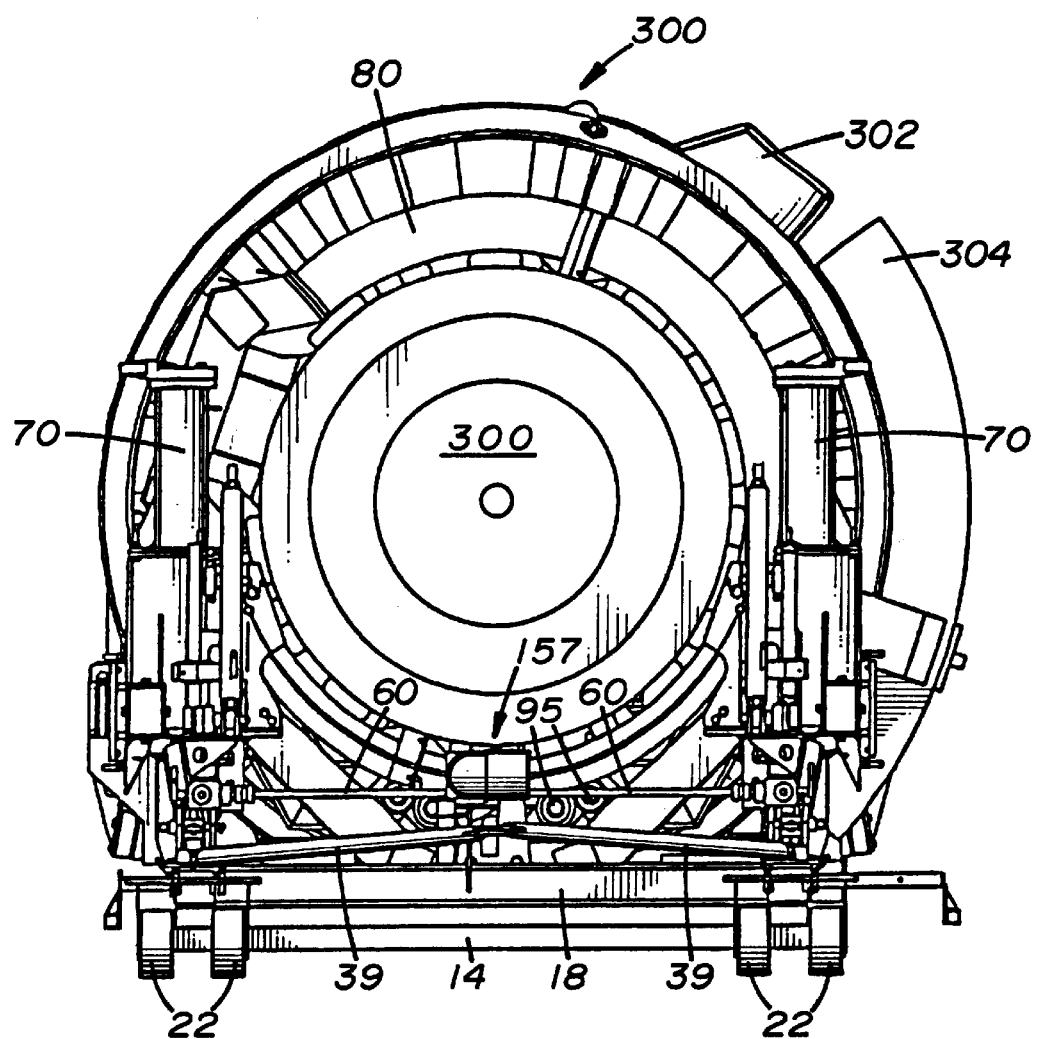
FIG. 9 is a rear elevation view of the shipping system with the loaded aircraft engine thereon.

The forward yoke assembly 120 is used in combination with the forward ring 100 to provide the necessary structural support to the forward end of the aircraft engine in the absence of cradle arms 70. The forward yoke assembly 120 is also used to facilitate the rotation of the aircraft engine when the shipping system is to be placed in the air transport mode. As best seen in FIG. 4, the forward yoke assembly 120 has its opposing ends mounted to the upper surfaces of shock mounts 28 when the cradle assembly has been lowered in the air transport mode. The forward yoke assembly 120 may be raised or lowered as necessary by the pair of forward jacks 152. FIGS. 1 and 8 illustrate the forward yoke assembly being raised by forward jacks 152 above shock mounts 28. The raising or lowering of the forward yoke assembly is stabilized by the use of jack stabilizer rods 124 and yoke connecting brackets 122 which interconnect the ends of the forward yoke 120 to the corresponding jack stabilizer rods 124. Spherical bearings (not shown) mounted within the connecting brackets 122 allows the connecting brackets 122 to slide up or down the stabilizer rods 124. Stabilizer rods 124 remain fixed to the upper surface of shock mounts 28 and provide the necessary stabilization to the jacks 152 as they raise or lower the cradle assembly. More specifically, when the forward yoke is raised or lowered, the jack screws 156 do not bear the rotational or horizontally directed stresses which may be present when the forward yoke is manipulated because of the stabilization provided by rods 124 attached by brackets 122 to the forward yoke.

The aft pair of jacks 152 are also stabilized by the use of a pair of aft jack stabilizer rods 125 which are mounted to the upper surfaces of aft shock mounts 36. Aft yoke connecting brackets 123 interconnect the aft stabilizer rods 125 to brackets 87. Thus, as the aft yoke 94 is raised or lowered, any rotational or horizontally directed forces will be induced upon stabilizer rods 125 as such forces could otherwise damage the jacks 152.

Figure 23:
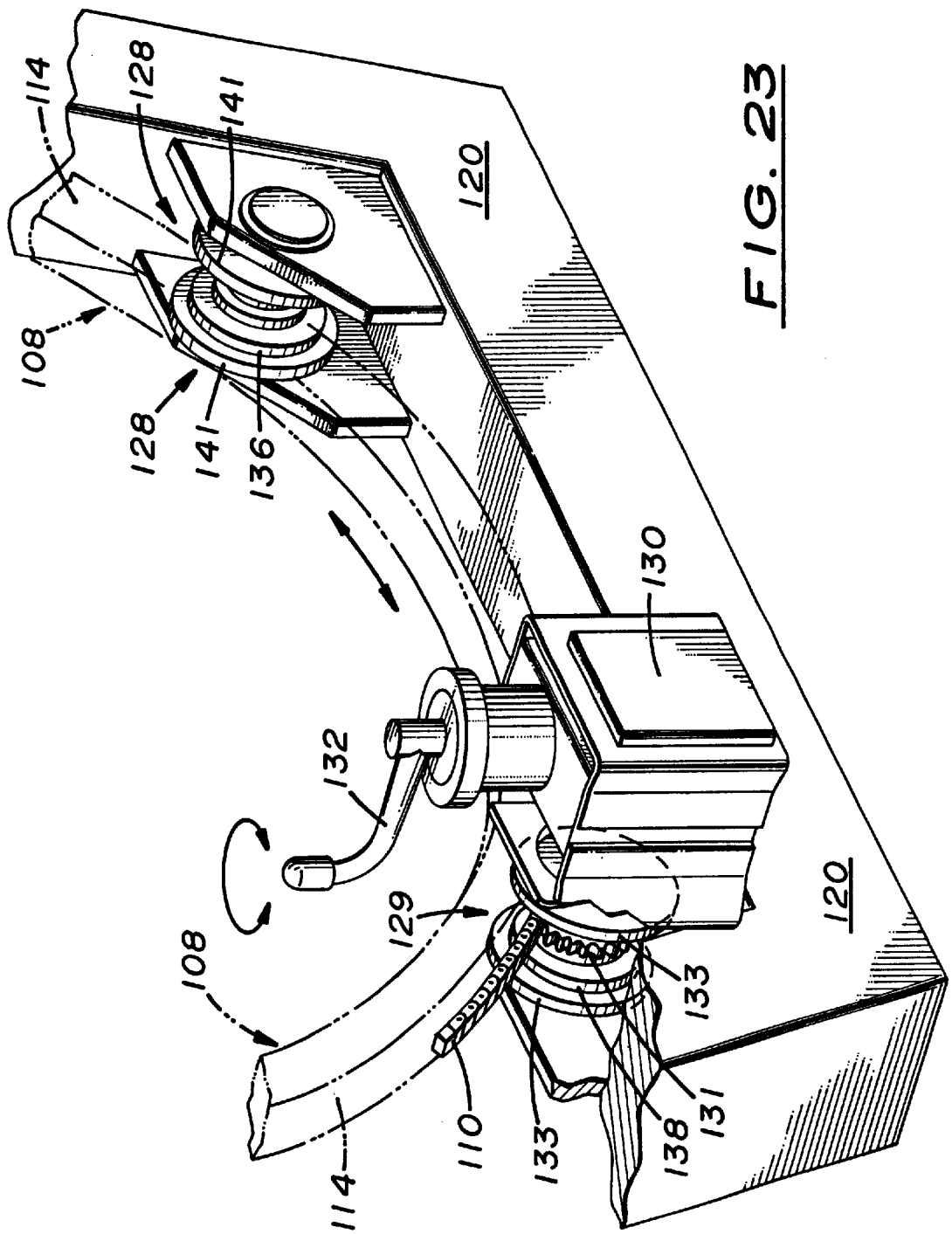
FIG. 23 is an enlarged fragmentary perspective view of the drive means of the forward ring which enables the aircraft engine to be rotated while mounted to the shipping system.

As best seen in FIG. 23, in order to rotate the forward ring 100, the forward yoke assembly 120 is raised so that roller 128 and roller/sprocket group 129 come into contact with the peripheral rim 114 of load ring 108. More specifically, sprocket 131 of roller sprocket group 129 engages drive chain 110. One area of the peripheral rim 114 lies between the outer rims 140 of rollers 128 and rests on the annular flanges 136 of the rollers 128. Another area of the peripheral rim 114 lies between outer rims 133 and rests on annular flanges 138 of roller sprocket group 129. A gear box 130 mounts to the forward yoke assembly 120 and includes a drive shaft 140 (FIG. 11 only with gear box 130 not shown) which connects to roller/sprocket group 129. A hand crank 132 or an air motor (not shown) may be used to provide power to the shaft 140 (FIG. 11 only) which in turn causes rotation of the sprocket 131 to engage the drive chain 110. The hand crank 132 or air motor can cause the forward ring to rotate in either the clockwise or counterclockwise direction.

Figure 14:
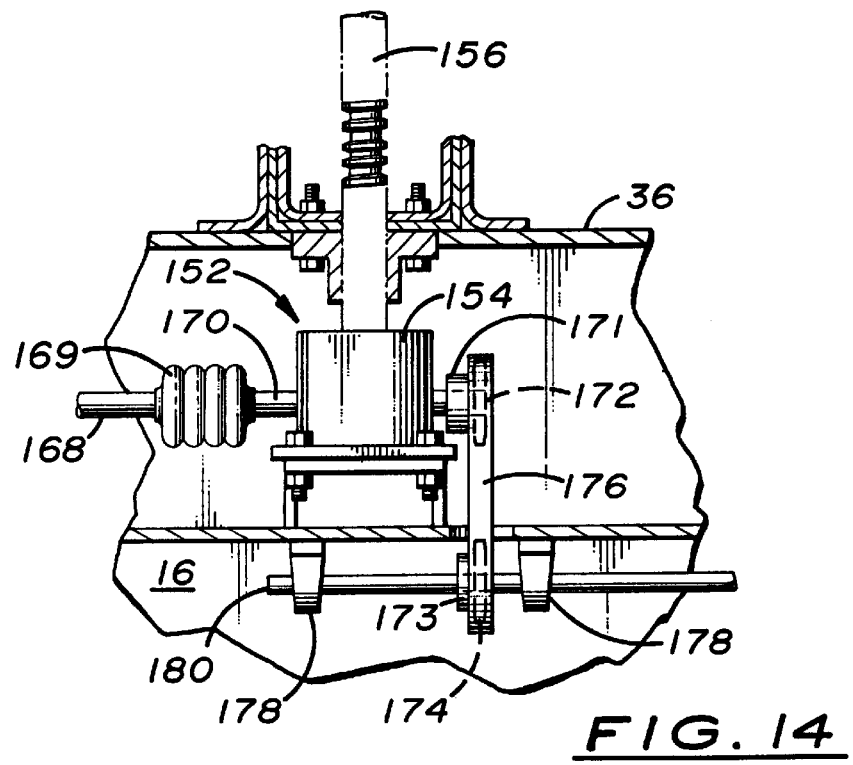
FIG. 14 is an enlarged fragmentary elevation view of an aft jack.
Figure 15:
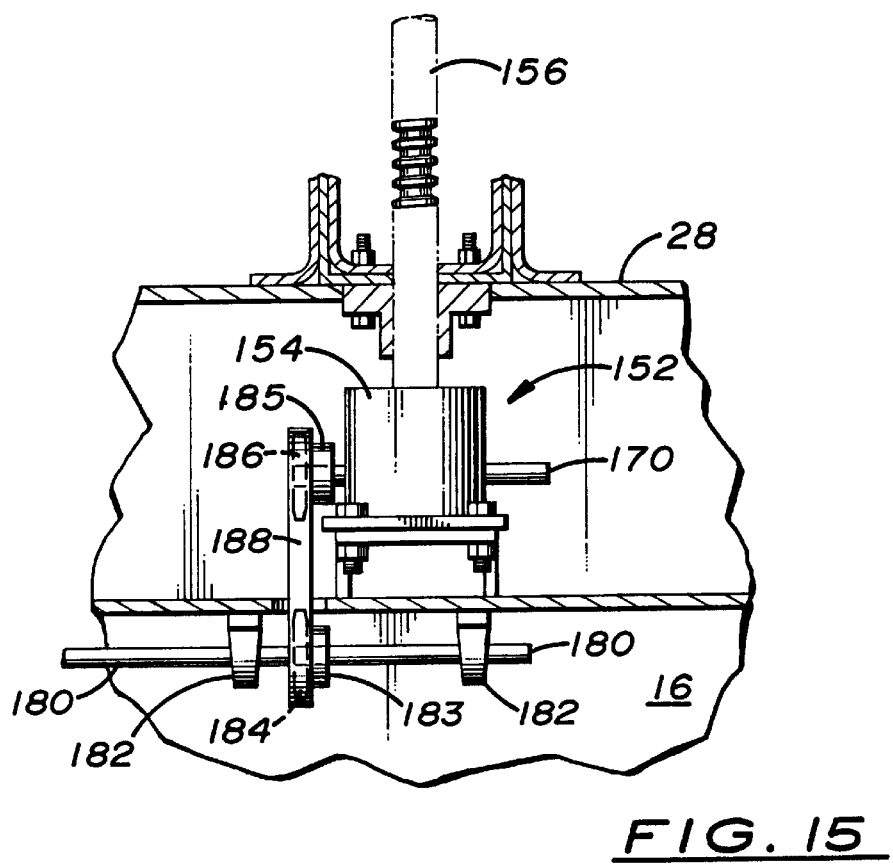
FIG. 15 is an enlarged fragmentary elevation view of a forward jack connected to the aft jack of FIG. 14.

The jack assembly of the shipping system is capable of raising or lowering the entire cradle assembly, or may selectively raise or lower only the forward yoke assembly 120 when it is necessary to place the aircraft engine in the air transport mode. As best seen in FIGS. 1, 2, and 13–15, the jack system includes four mechanical jacks 152 which are located at each corner of the shipping system. In the preferred embodiment, the jacks are illustrated as being common screw-type jacks, but it shall be understood that any well known industrial jack could be used, such as a hydraulic or pneumatic jack. Each jack 152 includes a jack body 154 and jack shafts or screws 156 which move up or down depending upon how the jacks are operated. Each of the jacks are synchronized by a jack control group 157. The jack control group includes a central gear reducer 158 having a pair of opposing drive shafts 160 which ultimately transfer power to aft jacks 152. An air motor 162 connects to the gear reducer 158 by 90° gear box 164. Alternatively, hand crank 163 may be used which allows manual operation of the jack assembly. The distal ends of drive shafts 160 connect to 90° gear or miter boxes 166. The output sides of miter boxes 166 include shafts 168 which connect directly to aft jacks 152. Shafts 168 may include one or more universal joints 169 (FIG. 14 only) in order to properly align the connection between miter boxes 166 and aft jacks 152. The purpose of 90° gear box 164 is simply to allow the jack control group 157 to be placed in a more central location as the air motor 162 would otherwise extend in the aft direction if directly connected to gear box 158. Jack bodies 154 each include a transfer shaft 170 which cooperates with internal gearing within the jack bodies (not shown) to transfer power such that jack screws 156 are raised or lowered. FIG. 14 illustrates an aft jack 152. The output side of aft jack shaft 170 includes upper hub 171 and upper drive sprocket 172. A longitudinal transfer shaft 180 is mounted under or through longitudinal member 16 by a pair of pillow blocks 178. Mounted concentrically around shaft 180 is a lower hub 173 and lower sprocket 174. An endless drive chain 176 interconnects the upper and lower sprockets. As shown in FIG. 15, the opposite end of transfer shaft 180 is mounted to the forward ends of longitudinal members 16 by another pair of pillow blocks 182. A lower hub 183 and sprocket 184 are mounted to transfer shaft 180, in the same way as hub 173 and sprocket 174. An upper hub 185 and sprocket 186 mount to the input side of shaft 170 of the forward jack 152, and another endless chain 188 connects these upper and lower sprockets. The pair of forward jacks 152 has been illustrated with the same reference numbers as the pair of aft jacks 152.

If the jack control system 157 becomes inoperative, each of the jacks 152 can be manually operated. For the aft jacks, shafts 168 are disconnected and are replaced with a hand operated crank connected directly to the input sides of shafts 70. For the forward jacks, a hand crank may connect directly to the free ends of shafts 70. Shafts 180 are also disconnected. In order to raise or lower the cradle assembly under such circumstances, all four jacks must be operated simultaneously to prevent unequal lifting or lowering.

The above-described jack assembly may synchronously operate each of the four jacks. However, it may be necessary to independently raise or lower the forward yoke assembly 120 so that it may be removed. For example, the shipping system of this invention is also capable of handling an aircraft engine which has the inlet cowl still mounted to the aircraft engine. The commonly assigned U.S. Pat. No. 5,722,512 illustrates an aircraft engine including an inlet cowl. This patent is hereby incorporated by reference for purposes of showing the aircraft engine with the inlet cowl. With the inlet cowl attached, it is necessary to remove the forward yoke assembly as it would interfere with the inlet cowl. When the Trent 800 aircraft engine is to be shipped with the inlet cowl, such shipment can only take place in the truck transport mode as the inlet cowl will not fit within the cargo door of a 747 aircraft.

Figure 25:
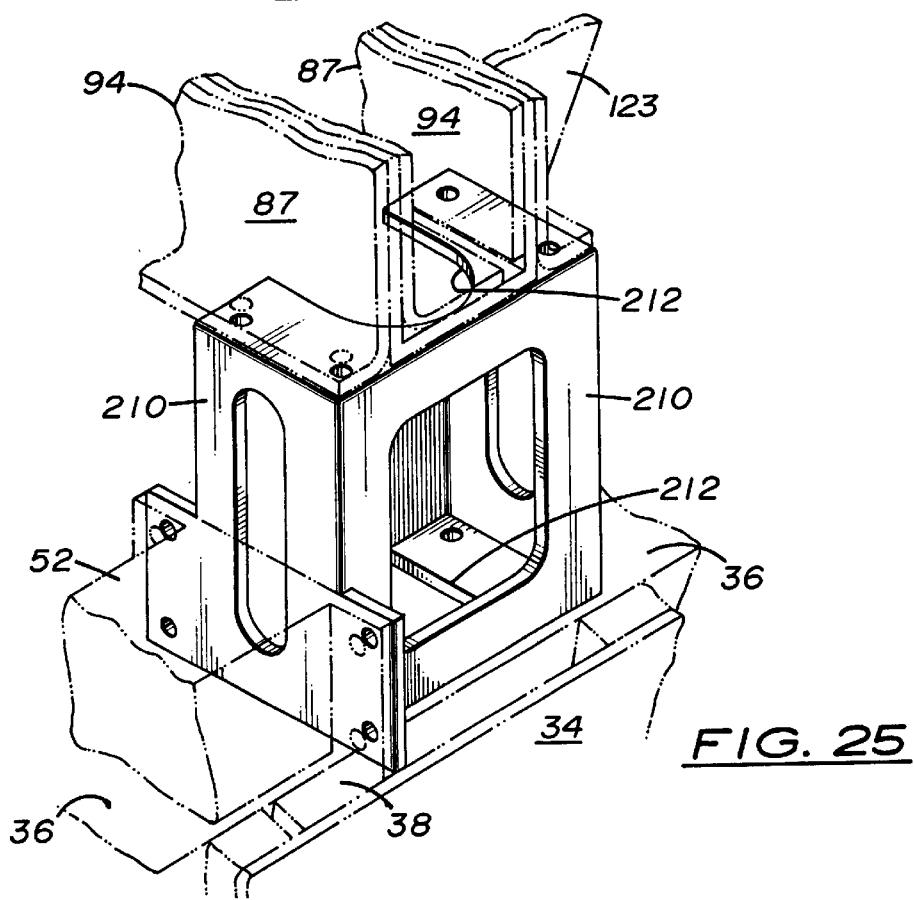
FIG. 25 is an enlarged fragmentary perspective view of the truck mode spacers and their arrangement with the other components of the shipping system.

In this, and in other situations in which the inlet cowl is still attached to the engine, or when it is otherwise simply unnecessary for the aft yoke to be lowered with the forward yoke, a pair of truck mode spacers 210 may be used to stabilize the shipping system in the truck transport mode position. As best seen in FIGS. 1–3 and 25, the truck spacers 210 are inserted between brackets 87 and aft shock mounts 36. As shown in FIG. 25, the truck spacers 210 include semi-circular openings defined by edges 212 which allow the caps 159 of the jack screws 156 to freely traverse therethrough. Accordingly, the jack assembly may be operated when the truck spacers are mounted in order to raise and lower the forward yoke assembly 120 without raising or lowering the aft yoke assembly 94. The truck spacers 210 are removed when the shipping system is placed in the air transport mode which allows the aft yoke to rest directly on the upper surfaces of shock mounts 36.

Figure 6:
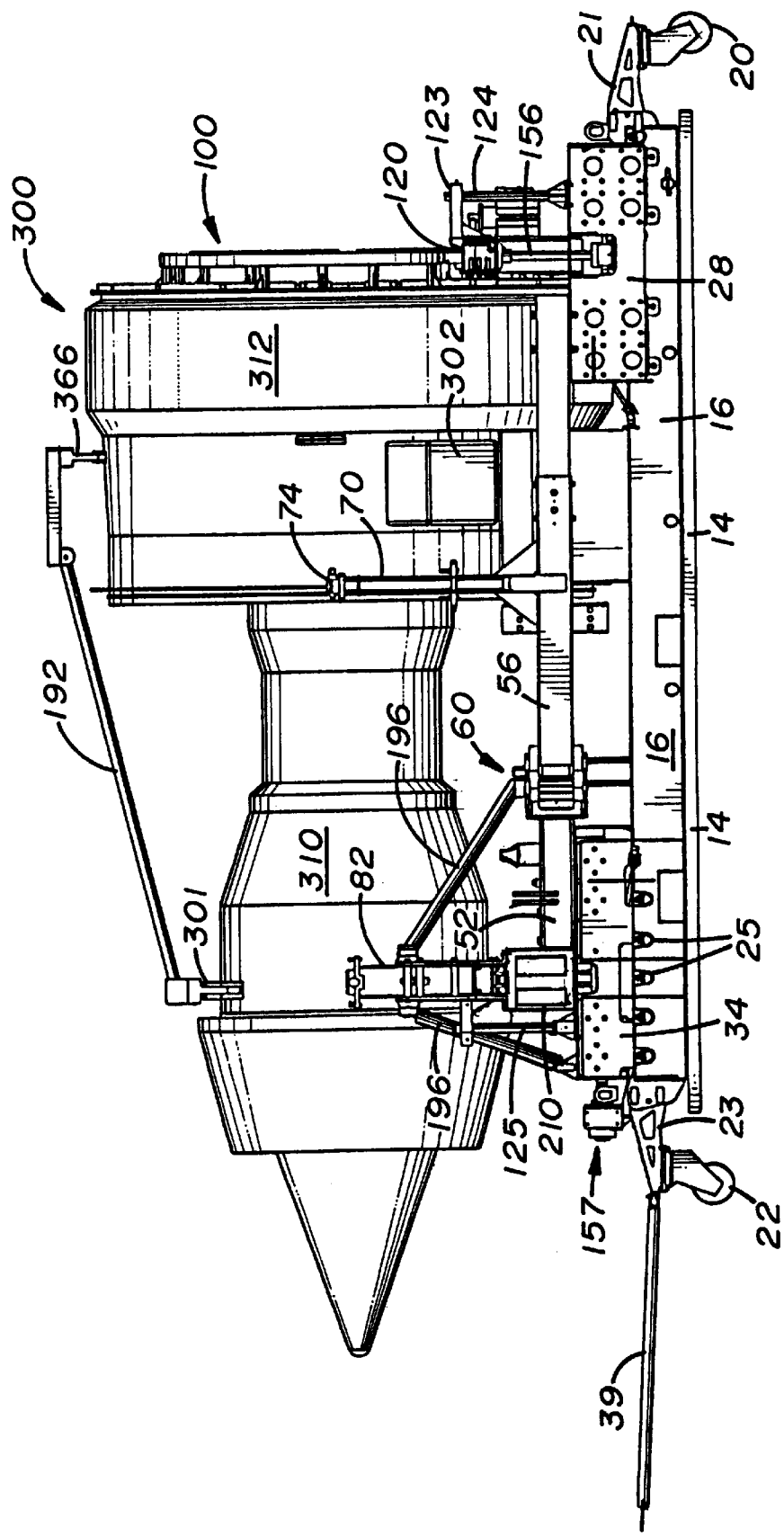
FIG. 6 is an elevation view of the shipping system configured in the truck transport mode, but with the forward ring remaining on the shipping system.

Once the shipping system has been placed in either the truck or air transport mode, additional stabilization of the aircraft engine mounted on the shipping system may be achieved by the use of brace tubes. As best seen in FIG. 6, an upper brace tube 192 may interconnect the aft flight mount 301 to the forward flight mount 306 of the engine 300. In the truck transport mode, this upper brace tube 192 prevents undesirable twisting of the engine fan section 308 with respect to the engine core section 310. This additional torque resisting feature is desirable as the forward ring 100 is not normally used in the truck transport mode which inherently provides greater torque resistance in combination with a fully assembled aft ring 80 in the air transport mode.

In the truck transport mode, as best seen in FIGS. 1–3 and 6, two pairs of truck brace tubes 196 are used to further support the aft ring to the frame assembly and cradle assembly. As shown, the most aft pair of truck brace tubes 196 are mounted at their lower ends to the aft shock mounts 36, and are mounted at their upper ends to brackets 87. The most forward pair of truck brace tubes 196 are attached at their lower ends to one of the transverse support members 54, and are attached at their upper ends to the opposite sides of brackets 87.

Figure 7:
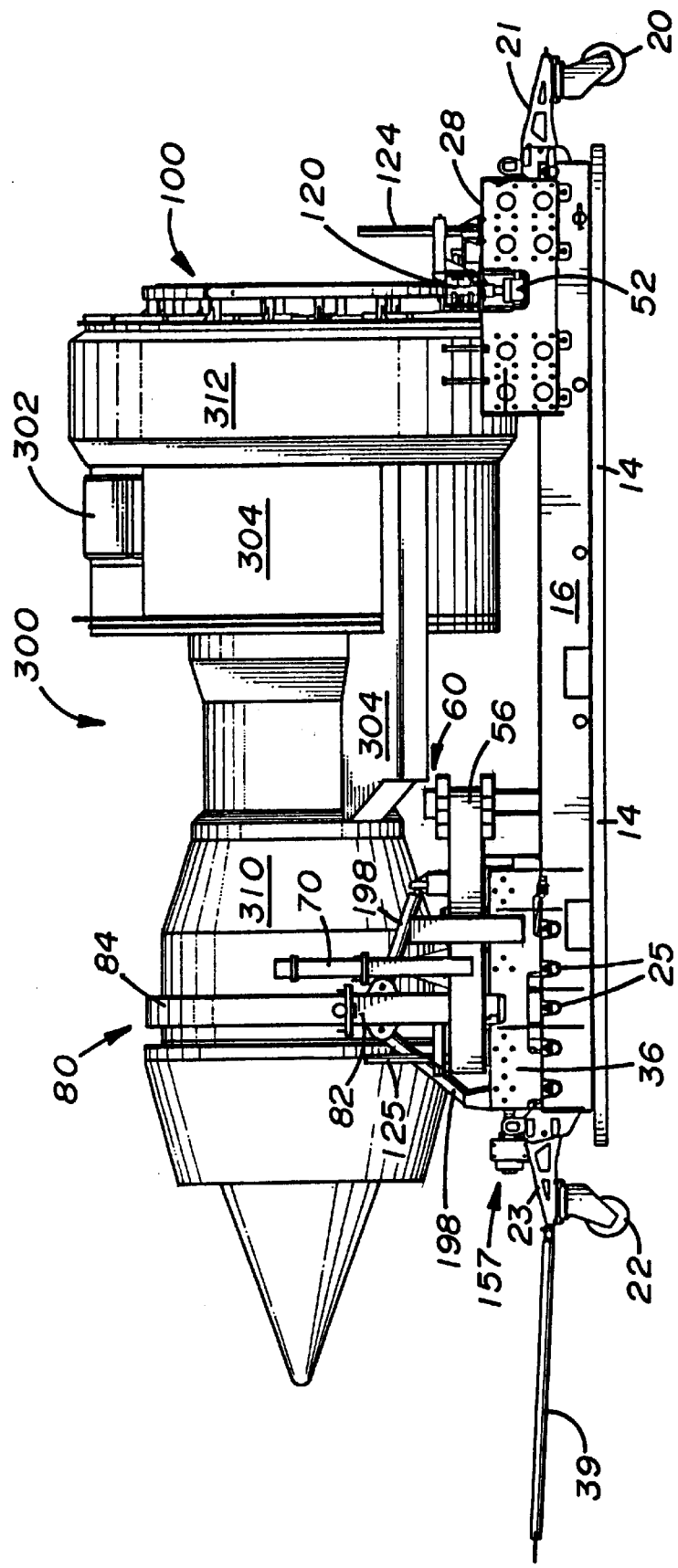
FIG. 7 is another elevation view of the shipping system, but illustrated in the air transport mode with the cradle arms rotated.

In the air transport mode, two pairs of air brace tubes 198 are also used as best seen in FIGS. 4, 5 and 7.These air brace tubes 198 are shorter than the truck brace tubes 196 since the cradle assembly is lowered in the air transport mode. The aft pair of air brace tubes 198 are connected to the shipping system in the same manner as the truck brace tubes 196. The forward pair of air brace tubes 196 are connected to the shipping system in the same manner as the forward truck brace tubes 196 with the exception that the lower ends of the forward pair of air brace tubes 198 attach to the aft longitudinal members 52.

B. System Operation

1. Removing an Aircraft Engine (with Inlet Cowl) from the Wing of an Aircraft and Placing the Shipping System in the Truck Transport Mode The forward yoke assembly 120 is removed from the shipping system. If the forward yoke is lowered and secured, the bolts which connect each end of the forward yoke assembly to shock mounts 28 are removed. The bolts connecting the yoke assembly to the forward yoke connecting brackets 122 are also removed. The forward pair of jacks 152 along with their corresponding jack stabilizer rods 124 are also removed. Prior to removing the yoke assembly, the cradle assembly has been lifted and the truck spacers 210 have been mounted and secured. The shipping system is then placed under the wing of the aircraft in rough alignment with the aircraft engine to be removed from the wing. As shown in FIG. 26, the chain/pulley system 69 is connected to the pair of aft bootstrap connection points 64 and the pair of forward bootstrap connection point 66. The chain/pulley system is also attached to four corresponding mount points (not shown) on the underside of the aircraft wing 204. The shipping system is then precisely centered under the aircraft engine 300 by lifting the shipping system in the air and then lowering it. The wing of the aircraft bears the load of the shipping system as it is raised and lowered. Once the shipping system has been precisely centered under the aircraft engine 300, the cradle assembly is separated from the frame assembly by removing the brace tubes 196 and the four pair of bolts which connect the cradle frame group 50 to the frame assembly. Two pairs of these bolts are located at the ends 57 of the longitudinal members 56, and the other two pair of bolts are located at the aft ends of aft longitudinal members 52 (see bolt holes, FIG. 11). Once the cradle assembly has been fully disconnected from the frame assembly, the cradle assembly is lifted by the chain/pulley system 69. The cradle assembly is then attached to the aircraft engine by connecting the stanchion pin connections 88 of the aft ring 80 to the aft or stanchion mounting points (not shown) of the aircraft engine, and connecting the pin/spherical bearing connectors 74 of the cradle arms 70 to the forward engine mount points 308. The aircraft engine is then disconnected from the aircraft wing at the aft flight mount 301 and forward flight mount 306. The cradle assembly and the attached aircraft engine are lowered and the cradle is re-secured to the frame assembly by replacing the four sets of corner bolts. The lower aft ring portion 82 may then be secured to the aft yoke by pinning the lower end of the lower aft ring portion to support brackets 96 and 97, and securing the upper ends of the lower aft ring portion 82 to brackets 87. In the truck transport mode, it is unnecessary to add the intermediate aft ring portions 84 and upper aft ring portion 86; however, if the shipping system is placed in the air transport mode, the aft ring 80 must be fully assembled. Lastly, the truck brace tubes 192 and 196 may be installed.

2. Removing the Aircraft Engine (Inlet Cowl Removed) from the Wing and Placing the Shipping System in the Truck Transport Mode This procedure is the same as the one previously described with the exception that the forward yoke 120, forward jacks 152, connecting brackets 122, and jack stabilizer rods 124 do not have to be removed since the profile of the aircraft engine is much smaller without the inlet cowl. It is only necessary to lower the forward yoke assembly 120 by the jack assembly to avoid contact between the forward yoke and the fan 312 of the aircraft engine 300. Also, it is possible to lower the cradle assembly which allows removal of the truck spacers 210 depending upon the particular size of aircraft engine being transported.

3. Removing the Aircraft Engine (Inlet Cowl Removed) from the Wing of the Aircraft and Placing the Shipping System in the Air Transport Mode If not already placed in the truck transport mode, the cradle assembly is lifted by the jack assembly and the truck mode spacers 210 are emplaced. The jack assembly is then activated to lower only the forward yoke assembly 120. The shipping system is placed under the wing of the aircraft, and the same procedure as described above is used to precisely align the shipping system under the aircraft engine to be removed from the wing. Next, the cradle assembly is removed from the frame assembly and the cradle assembly is raised by the chain/pulley system 69 and connected to the aircraft engine. The aircraft engine is detached from the aircraft wing, and the cradle assembly with the aircraft engine is lowered by the chain/pulley system. The cradle assembly is reconnected to the frame assembly. Next, the forward ring 100 is mounted to the aircraft engine fan by bolting the paddles 106 to the fan section 312 of the aircraft engine. With the truck mode spacers 210 still in place, the forward yoke 120 is raised until it engages the load-bearing ring 108. The aft ring 80 may then be fully assembled to connect the aft flight mount 301 to the upper aft ring portion 86. The pin/spherical bearing connections 74 of the cradle arms 70 are disconnected from the forward engine mounts 308. The cradle arms 70 are then rotated 180° away from the aircraft engine about hinges 60 and are placed in a secured stowed position. The telescoping sections 58 are pushed in and secured within their corresponding longitudinal members 56. The aircraft engine is now in a configuration that it may be rotated. Using the hand crank 132 or air motor (not shown), the aircraft engine is then rotated. For the Trent 800 aircraft engine, it is rotated 71.5° which enables the gear box 302 and the other protruding components 304 to be placed in a position that they will not be crushed or damaged when the shipping system is later lowered. The truck mode spacers 210 are removed and the jack assembly is activated to lower the aircraft engine until the forward and aft yoke assemblies rest on the upper surfaces of forward shock mounts 28 and aft shock mounts 36, respectively. The forward and aft yokes are then secured to the shock mount 28 and 36. The aft ring 80 may now be secured to the aft yoke 94 and brackets 87 as discussed above. The air brace tubes 198 are installed and the aircraft engine is now prepared for air shipment.

In order to reinstall the aircraft engine onto the aircraft, the above procedures may simply be performed in reverse order. In the air transport mode, if the aircraft engine has been rotated, it is simply rotated back to its normal position so that flight mounts 301 and 306 are at the top center position.

As previously discussed, it should also be understood that the distinction between the truck and air transport modes is only necessary to be made when an aircraft engine must be rotated to satisfy a critical dimension for loading the aircraft engine through the cargo hold of a particular aircraft. In all aircraft engines, there is some protruding segment or portion which gives the aircraft engine an overall larger diameter. By placement of the shipping system in the air transport mode, this critical dimension can be located at a desired position in order that the aircraft engine may be capable of being loaded through a particular cargo door. Also, it is possible to use the forward ring 100 in the truck transport mode; however, this additional support to the aircraft engine is unnecessary as the cradle arms 70 in combination with the rear yoke 94 provide adequate support. Conversely, if there is no critical dimension which must be overcome by rotating the aircraft engine on the shipping system, the shipping system could remain in the truck transport mode during air shipment. For example, the cargo holds of an Antoniv, AN124 or C-5A aircraft will readily accept the Trent 800 engine without having to rotate it while mounted to the shipping system.

This invention has been described in detail with reference to a particular embodiment thereof, but it will be understood that various other modifications can be effected within the spirit of the scope of this invention.

What is claimed is:

1. A method of removing an aircraft engine from an aircraft on which it is mounted and securing the removed aircraft engine on a shipping system for subsequent truck or air transport, said method comprising the steps of:

providing the shipping system with a cradle assembly mounted on a frame assembly;

positioning the shipping system under a wing of an aircraft and in rough alignment with the aircraft engine to be removed from the wing;

installing a pulley system interconnecting the aircraft wing and the shipping system;

lifting the shipping system above the ground by the pulley system and then lowering the shipping system back to the ground in order to obtain precise alignment of the shipping system under the wing;

separating the cradle assembly from the frame assembly;

raising the cradle assembly by the pulley system;

attaching the aircraft engine to the cradle assembly;

detaching the aircraft engine from the wing of the aircraft;

lowering the cradle assembly and aircraft engine by the pulley system;

reattaching the cradle assembly to the frame assembly; and detaching the pulley system from the wing of the aircraft and from the cradle assembly.

2. A method, as claimed in claim 1, further including the step of:

rotating the aircraft engine while mounted to the shipping system after the cradle assembly is reattached to the frame assembly.

3. A method of installing an aircraft engine onto a wing of an aircraft when the aircraft engine is mounted on a shipping system, said method comprising the steps of:

providing the shipping system with a cradle assembly mounted on a frame assembly;

positioning the shipping system under the wing of the aircraft;

installing a pulley system on bootstrap attachment points on the shipping system and on attachment points on the wing of the aircraft to interconnect the shipping system to the wing of the aircraft;

precisely aligning the shipping system under the wing of the aircraft by lifting the shipping system with the aircraft engine mounted thereon above the ground by means of the pulley system, and then lowering the shipping system with the mounted aircraft engine back to the ground;

disconnecting the cradle assembly from the frame assembly;

lifting the cradle assembly and the mounted aircraft engine by means of the pulley system;

attaching the aircraft engine to the wing of the aircraft;

separating the cradle assembly from the aircraft engine;

lowering the cradle assembly away from the aircraft engine;

reattaching the cradle assembly to the frame assembly; and detaching the pulley system from the wing of the aircraft and from the shipping system.

4. A method of installing an aircraft engine having flight mounts onto a wing of an aircraft when the aircraft engine is mounted on a shipping system, said method comprising the steps of:

providing a shipping system including a cradle assembly which allows the aircraft engine to be rotated on the shipping system while mounted thereon, and a frame assembly for receiving the cradle assembly and supporting the cradle assembly;

rotating the aircraft engine on the shipping system to a position so that the aircraft engine may be mounted to the wing of the aircraft;

installing a pulley system to interconnect the wing of the aircraft to the shipping system;

precisely aligning the shipping system under the wing of the aircraft by lifting the shipping system with aircraft engine loaded thereon above the ground by means of the pulley system and then lowering the shipping system with the loaded aircraft engine back to the ground;

disconnecting the cradle assembly from the frame assembly;

lifting the cradle assembly with the loaded aircraft engine by mean of the pulley system;

attaching the flight mounts of the aircraft engine to the wing of the aircraft;

disconnecting the aircraft engine from the cradle assembly;

lowering the cradle assembly away from the aircraft engine by means of the pulley system;

reattaching the cradle assembly to the frame assembly; and detaching the pulley system from the wing of the aircraft and from the shipping system.

* * * * *